(12) United States Patent
Suzuki et al.

(10) Patent No.: US 8,999,043 B2
(45) Date of Patent: Apr. 7, 2015

(54) AIR CONDITIONING SYSTEM

(75) Inventors: Yoshinobu Suzuki, Nagakute (JP);
Katsunori Iwase, Kariya (JP); Takehiro Kurata, Kariya (JP); Manabu Maeda, Nagoya (JP); Yoshinori Yoneda, Annaka (JP); Hiroaki Tetsuka, Annaka (JP); Jyunya Ishida, Saitama (JP)

(73) Assignees: DENSO CORPORATION, Kariya (JP); Shin-Etsu Chemical Co., Ltd., Tokyo (JP); Shin-Etsu Polymer Co., Ltd, Tokyo (JP)

( * ) Notice: Subject to any disclaimer, the term of this patent is extended or adjusted under 35 U.S.C. 154(b) by 0 days.

(21) Appl. No.: 14/236,301

(22) PCT Filed: Aug. 1, 2012

(86) PCT No.: PCT/JP2012/004880
§ 371 (c)(1),
(2), (4) Date: Jan. 30, 2014

(87) PCT Pub. No.: WO2013/018361
PCT Pub. Date: Feb. 7, 2013

(65) Prior Publication Data
US 2014/0165838 A1    Jun. 19, 2014

(30) Foreign Application Priority Data

Aug. 2, 2011   (JP) .................................. 2011-169478
Jul. 27, 2012   (JP) .................................. 2012-167071

(51) Int. Cl.
| | | |
|---|---|---|
| *B01D 53/22* | (2006.01) | |
| *B01D 71/26* | (2006.01) | |
| *B60H 3/06* | (2006.01) | |
| *B01D 69/12* | (2006.01) | |
| *B01D 67/00* | (2006.01) | |
| *B01D 71/64* | (2006.01) | |
| *B01D 69/02* | (2006.01) | |
| *C08K 3/36* | (2006.01) | |
| *C08L 45/00* | (2006.01) | |
| *F24F 13/28* | (2006.01) | |
| *F24F 3/14* | (2006.01) | |

(52) U.S. Cl.
CPC ................ *B01D 71/26* (2013.01); *B01D 69/12* (2013.01); *B01D 67/0088* (2013.01); *B01D 53/228* (2013.01); *B01D 71/64* (2013.01); *B01D 69/02* (2013.01); *B60H 3/06* (2013.01); *C08K 3/36* (2013.01); *C08L 45/00* (2013.01); *F24F 13/28* (2013.01); *B60H 2003/0666* (2013.01); *F24F 2003/1435* (2013.01); *B01D 2323/21* (2013.01)

(58) Field of Classification Search
CPC .. B01D 96/12; B01D 53/228; B01D 67/0088; B01D 69/02; B01D 71/64
See application file for complete search history.

(56) References Cited

U.S. PATENT DOCUMENTS

| | | | |
|---|---|---|---|
| 5,595,658 A * | 1/1997 | Fritsch et al. | 210/490 |
| 8,017,050 B2 * | 9/2011 | Freeman et al. | 264/48 |
| 8,748,749 B2 * | 6/2014 | Srinivas et al. | 174/250 |
| 2010/0059433 A1 * | 3/2010 | Freeman et al. | 210/321.6 |
| 2010/0190950 A1 | 7/2010 | Tetsuka et al. | |
| 2010/0294132 A1 | 11/2010 | Ishida et al. | |
| 2010/0326121 A1 | 12/2010 | Ishida et al. | |
| 2012/0073791 A1 * | 3/2012 | Dubois | 165/138 |
| 2012/0111791 A1 * | 5/2012 | Freeman et al. | 210/500.34 |
| 2012/0302427 A1 * | 11/2012 | Elmouelhi et al. | 502/5 |
| 2013/0056244 A1 * | 3/2013 | Srinivas et al. | 174/250 |
| 2013/0156615 A1 * | 6/2013 | Puleo et al. | 417/410.1 |
| 2014/0284083 A1 * | 9/2014 | Srinivas et al. | 174/251 |

FOREIGN PATENT DOCUMENTS

| | | |
|---|---|---|
| JP | 2009-13183 | 6/2009 |
| JP | 2010-174099 A | 8/2010 |
| JP | 2011-012114 A | 1/2011 |

OTHER PUBLICATIONS

International Search Report and Written Opinion of the ISA for PCT/JP2012/004880, ISA/JP, mailed Oct. 16, 2012, 9 pages.

* cited by examiner

*Primary Examiner* — Jason M Greene
*Assistant Examiner* — Anthony Shumate
(74) *Attorney, Agent, or Firm* — Harness, Dickey & Pierce, PLC

(57) ABSTRACT

As a permeable membrane of an air conditioning system that performs as supply to a space to be air conditioned through the permeable membrane and/or gas discharge from the space to be air conditioned through the permeable membrane, an asymmetric membrane is used. The asymmetric membrane is made of a cyclic olefin addition polymer obtained by addition polymerization of a cyclic olefin functionality siloxane, or by addition polymerization of the cyclic olefin functionality siloxane and a cyclic olefin compound, and in which a rate of a structural unit derived from the cyclic olefin functionality siloxane is 5 to 100 mol % of the addition polymer, and a number average molecular weight (Mn) is 10,000 to 2,000,000 in terms of polystyrene conversion measured by a GPC using tetrahydrofuran as a solvent.

6 Claims, 16 Drawing Sheets

AIR CONDITIONING SYSTEM

CROSS REFERENCE TO RELATED APPLICATION APPLICATIONS

The present application is a U.S. National Phase application under 35 U.S.C. §371 of International Application No. PCT/JP2012/004880, filed on Aug. 1, 2012, which is based on Japanese Patent Applications No. 2011-169478 filed on Aug. 2, 2011 and No. 2012-167071 filed on Jul. 27, 2012, and the disclosures of which are incorporated herein by reference.

TECHNICAL FIELD

The present disclosure relates to an air conditioning system.

BACKGROUND ART

Recently, it becomes possible to improve air-tightness also in a space that was difficult to improve the air-tightness, such as in vehicles, according to progression of technology. In a case where many passengers are aboard such a highly air-tight vehicle for a long time, a decrease in oxygen concentration or an increase in carbon dioxide concentration will occur, resulting in headache or displeasure to passengers. Therefore, it is necessary to introduce outside air appropriately.

However, urban roads, highways and the like are polluted with contaminants, such as particulates. Therefore, considering passengers health, it is a large problem to directly introduce the outside air into a passenger compartment. As a method for solving this problem, there is a method of installing a filter at a suction port through which the outside air is introduced so as to remove the contaminants in the atmosphere, such as suspended matters.

An air conditioning system using a gas permeable membrane provided by an asymmetric membrane made of a polymeric material has been proposed (see patent document 1). This air conditioning system is configured to use an asymmetric membrane having a high gas permeation property at the suction port of air as a filter to sufficiently introduce the outside air while blocking SPM (suspended particulate matter having a particle diameter of 10 μm or less in the atmosphere). Further, the patent document 1 describes to improve a mechanical strength of the membrane using a mesh body so as to restrict breakage of the gas permeable membrane due to an external stress, and to improve the strength of the gas permeable membrane by treating a surface of the mesh body with an adhesion improver.

However, even if the strength of the gas permeable membrane is improved by these means, among gas permeable membranes described in examples of the patent document 1, there is a gas permeable membrane that is broken by pressure of approximately 40 kPa. Therefore, durability for resisting to higher pressure is required.

PRIOR ART DOCUMENT

Patent Document

Patent document 1: Japanese Patent Application Document No. 2011-12114

SUMMARY OF INVENTION

The present disclosure has been made in view of the foregoing matter, and it is an object of the present disclosure to improve durability of a gas permeable membrane against an external force, such as pressure, while keeping a property of blocking suspended matters in the atmosphere and a gas permeation property, in an air conditioning system using the gas permeable membrane.

According to a first aspect of the present disclosure, an air conditioning system performs at least one of gas supply to a space to be air conditioned through a permeable membrane and gas discharge from the space to be air conditioned through the permeable membrane, in which the permeable membrane is an asymmetric membrane that is made of a cyclic olefin addition polymer obtained by addition polymerization of a cyclic olefin functionality siloxane expressed by a formula (1) given below, or by addition polymerization of the cyclic olefin functionality siloxane expressed by the formula (1) and a cyclic olefin compound expressed by a formula (2) given below, in which a rate of a structural unit derived from the cyclic olefin functionality siloxane expressed by the formula (1) given below is 5 to 100 mol % of the addition polymer, and in which a number average molecular weight (Mn) is 10,000 to 2,000,000 in terms of polystyrene conversion measured by GPC using tetrahydrofuran as a solvent.

[Chemical 1]

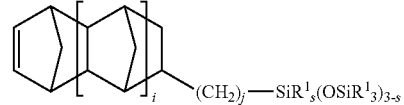

(1)

In the formula (1), $R^1$ is a monovalent organic group without having an aliphatic unsaturated bond, and is identical or different from each other, s is an integer of 0 to 2, i is 0 or 1, and j is an integer of 1 to 4.

[Chemical 2]

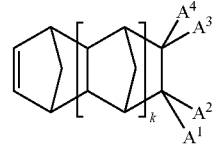

(2)

In the formula (2), $A^1$ to $A^4$ are each independently a hydrogen atom, a halogen atom, a substituent group selected from an alkyl group, an alkenyl group, a cycloalkyl group, an aryl group, an alkoxy group, an aryloxy group and a halogenated hydrocarbon group each having a carbon number of 1 to 10, or a polar substituent group selected from an oxetanyl group and an alkoxycarbonyl group. $A^1$ and $A^2$, or $A^1$ and $A^3$ may form, together with a carbon atom to which they are attached, an alicyclic structure, an aromatic ring structure, a carbon imide group, or an acid anhydride group. Further, k is 0 or 1.

According to the above-described air conditioning system, an elongation property of the permeable membrane is improved, and the permeable membrane can be provided with flexibility. As the membrane is temporarily deformed by an external force, such as a pressure change, and releases the force, breakage of the membrane can be restricted. Therefore, the durability of the permeable membrane against the external stress, such as pressure, can be improved while keeping the blocking property of the suspended matters and the gas permeability of the permeable membrane. The asymmetric membrane means a membrane that has a porous layer and a dense layer adjacent to the porous layer. The above-described asymmetric membrane preferably has nanometer-sized or micrometer-sized pores on a surface of the dense layer.

According to a second aspect of the present disclosure, the polymeric material is a polymeric material in which a silica filler is dispersed. In this case, the gas permeability of the asymmetric membrane improves.

According to a third aspect of the present disclosure, a ratio between an oxygen permeability coefficient $P(O_2)$ and a carbon dioxide permeability coefficient $P(CO_2)$ of the asymmetric membrane at 23±2° C. and under no pressure difference across the membrane satisfies a formula (3) given below. In this case, the effect is further remarkably achieved.

$$1.0<P(O_2)/P(CO_2)<1.70 \quad (3)$$

The above-described air conditioning system can be used, for example, as an air conditioning system for vehicles, an air conditioning system for residential houses, an air conditioning system for containers, and the like.

BRIEF DESCRIPTION OF DRAWINGS

The above and other objects, features and advantages of the present disclosure will become more apparent from the following detailed description made with reference to the accompanying drawings, in which.

EMBODIMENTS FOR CARRYING OUT INVENTION

Hereinafter, embodiments to which the present disclosure is applied will be described with reference to the drawings. However, the present disclosure will not be limited to the following embodiments.

First Embodiment

Asymmetric Membrane

An asymmetric membrane of the present disclosure is suitably used as a permeable membrane in an air conditioning method that supplies gas to a space to be air conditioned through the permeable membrane and/or discharges gas from the space to be air conditioned. An air conditioning system according to the present embodiment includes a permeable membrane that performs gas supply to the space to be air conditioned and/or gas discharge from the space to be air conditioned, and a partition wall that forms an opening to which the permeable membrane is disposed and the space to be air conditioned. The partition wall is made of a single or multiple members that are formed to block gas transmission.

The permeable membrane is, for example, disposed at a suction port for suctioning outside air. The space to be air conditioned is a space necessary for exchanging gas inside the space and the outside air. Specific examples of the space to be air conditioned are inside spaces of residential houses, vehicles (automobiles), containers, express trains (for example, bullet trains), air planes, and the like. These specific examples will be described as second and subsequent embodiments. As the first embodiment, a structure of the permeable membrane will be described in detail.

Figure 1:
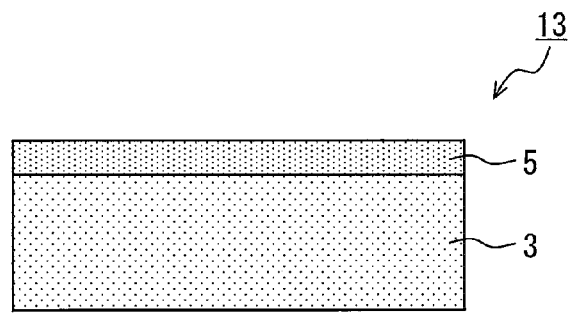
FIG. 1 is a cross-sectional view of an asymmetric membrane according to a first embodiment.

FIG. 1 is a cross-sectional view of an asymmetric membrane of the present embodiment. An asymmetric membrane 13 shown in FIG. 1 is composed of a porous layer 3 and a dense layer 5 adjacent to the porous layer 3. In this technical field, the dense layer 5 is referred to as a "skin layer" in some cases. The porous layer 3 and the dense layer 5 are integrally formed of the same polymeric material. The dense layer 5 has pores with a size in nanometer or micrometer (for example, 20 to 80 nanometers). Also in the second and subsequent embodiments, the asymmetric membrane 13 similar to the present embodiment is used.

Fillers may be dispersed in the asymmetric membrane 13. The asymmetric membrane 13 may contain only a polymeric material that forms an asymmetric structure including the porous layer 3 and the dense layer 5, or contain the polymeric material and fillers as major components, but may further contain other components.

The asymmetric membrane 13 preferably has a thickness of 0.1 to 10 μm.

The dense layer 5 has a function of selectively permeating gases such as nitrogen and oxygen while restricting permeation of SPM. For this purpose, the dense layer 5 may have a density that can sufficiently restrict the permeation of the SPM. In particular, nanometer-sized or micrometer-sized pores are formed on the surface of the dense layer 5. Further, the dense layer may be formed with pores having a pore volume smaller than that of the porous layer 3 in an open cell state or a half-open cell state.

The thickness of the dense layer 5 is preferably 1 μm or less so as to ensure sufficient gas permeability. Further, the thickness of the dense layer 5 is preferably 0.005 μm or more, and more preferably 0.01 μm or more.

The porous layer 3 functions as a support body for the dense layer 5 while keeping the gas permeability at a high level. If the thickness of the dense layer 5 is reduced so as to ensure the sufficient gas permeability and the dense layer 5 is used alone, the strength of the entire membrane is likely to be insufficient. However, as the porous layer 3 functions as the support body for supporting the dense layer 5, sufficient mechanical strength and ease of handling are maintained in the asymmetric membrane 13 as a whole. From these standpoints, the thickness of the porous layer 3 is preferably from 1 to 500 μm.

To achieve the object of the present disclosure at a particularly high level, the asymmetric membrane 13 is preferably a membrane whose gas permeation rate depends on the molecular weight of gas. In other words, it is preferable that Knudsen flow is predominant in the flows of gases within the asymmetric membrane 13. It is to be noted that "Knudsen flow" means the flow of a gas so thin that the molecular movement becomes problematic (see Dictionary of Chemistry, Vol. 3 edited by Committee of Dictionary of Chemistry, reduced-size edition, p. 44). When the Knudsen flow is predominant, the permeation rate of a gas depends on the reciprocal number of the square root of the molecular weight of the gas.

In a membrane through which a gas permeates by ideal Knudsen flow, the permeability coefficient P of the gas is inversely proportional to the square root of the molecular weight of the gas. For example, gas components permeated are oxygen and carbon dioxide, the separation ratio α thereof is 1.17, as expressed by formula (8) given below. In the formula (8), $P(O_2)$ and $P(CO_2)$ represent the permeability coefficient of oxygen and the permeability coefficient of carbon dioxide, respectively, and $M(O_2)$ and $M(CO_2)$ represent the molecular weight of oxygen and the molecular weight of carbon dioxide, respectively.

[Numeral 1]

$$\alpha = \frac{P(O_2)}{P(CO_2)} = \frac{\sqrt{M(CO_2)}}{\sqrt{M(O_2)}} = 1.17 \tag{8}$$

On the other hand, there is a gas flow referred to as "solution-diffusion flow". The solution-diffusion flow is a flow that depends on the product of the solubility of a gas in a membrane and the diffusion coefficient of the gas in the membrane. The permeation rate of a gas in the membrane by the solution-diffusion flow is generally slower than that by the Knudsen flow. In conventional polymeric membranes, the solution-diffusion flow is often predominant in the flows of gases permeating through the membranes. It is known that, in membranes in which the solution-diffusion flow is predominant, the separation ratio α between oxygen and carbon dioxide is less than 1.0 (approximately 0.3 to 0.7 depending on a polymer) because the permeation rate of carbon dioxide is generally larger than the permeation rate of oxygen.

As described above, it is possible to evaluate the condition of the flow of a gas permeating through a membrane based on the value of the separation ratio α. Although it is considered that mixtures of the various types of flow occurs in an actual membrane, it can be assumed that Knudsen flow is predominant when the separation ratio α ($=P(O_2)/P(CO_2)$) is in a range that satisfies formula (3) given below. The oxygen permeability coefficient $P(O_2)$ and the carbon dioxide permeability coefficient $P(CO_2)$ are measured at 23±2° C. and under a condition where there is substantially no pressure difference (total pressure) through the membrane.

$$1.0 < P(O_2)/P(CO_2) < 1.70 \tag{3}$$

Although the reason that Knudsen flow is predominant in the asymmetric membrane 13 is not necessarily clear, the present inventors believes the reason as described below.

First, it is considered that the gas permeability coefficient of the asymmetric membrane 13 depends on the permeability of the dense layer 5, and is less affected by the porous layer 3. It is considered that the Knudsen flow occurs in the pores formed on the surface of the dense layer 5 and/or a space inside of the dense layer 5, and the solution-diffusion flow occurs in the other of the dense layer 5. In this case, it is presumed that the Knudsen flow becomes predominant due to the number of flow channels through which gases permeate by the Knudsen flow being larger than the number of flow channels through which gases permeate by the solution-diffusion flow, and the gas permeability dramatically improves. Also, it is considered that, because the SPM is blocked at portions where the gases permeate through by the solution-diffusion flow, the suspended matters in the atmosphere, such as SPM, can be removed.

In a case where the fillers are dispersed in the asymmetric membrane 13 as described above, since the Knudsen flow occurs in gaps formed in boundaries between the fillers and the polymer, in addition to the pores formed on the surface of the dense layer 5 and/or the space inside of the dense layer 5, the gas permeability of the asymmetric membrane 13 further improves.

[Polymeric Material]
(1) Monomer Composition

A high gas permeability cyclic olefin addition polymer of the present embodiment is produced by carrying out addition polymerization of a cyclic olefin functionality siloxane expressed by formula (1) given below, or the cyclic olefin functionality siloxane expressed by the formula (1) and a cyclic olefin compound expressed by formula (2) given below.

[Chemical 3]

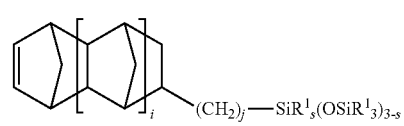

(1)

In the formula (1), $R^1$ is a monovalent organic group without having an aliphatic unsaturated bond, and is identical or different from each other, s is an integer of 0 to 2, i is 0 or 1, and j is an integer of 1 to 4.

[Chemical 4]

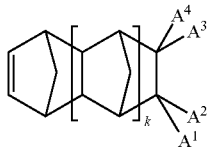

(2)

In the Formula (2), $A^1$ to $A^4$ are each independently a hydrogen atom, a halogen atom, a substituent group selected from an alkyl group, an alkenyl group, a cycloalkyl group, an aryl group, an alkoxy group, an aryloxy group and a halogenated hydrocarbon group each having a carbon number of 1 to 10, a polar substituent group selected from an oxetanyl group and an alkoxycarbonyl group. $A^1$ and $A^2$, or $A^1$ and $A^3$ may form, together with a carbon atom to which they are attached, an alicyclic structure, an aromatic ring structure, a carbon imide group, or an acid anhydride group. Further, k is 0 or 1.

In the formula (1), $R^1$ is a monovalent organic group without having an aliphatic unsaturated bond, and may be identical or different from each other, preferably, a substituted or unsubstituted monovalent hydrocarbon group having a carbon number of 1 to 10, for example, alkyl groups, such as a methyl group, an ethyl group, an n-propyl group, a butyl group, and a pentyl group, aryl groups, such as a phenyl group, a tolyl group, and a xylyl group, aralkyl groups, such as a 2-phenylethyl group and a 3-phenylpropyl group, and groups obtained by substituting one or more hydrogen atoms of these groups with halogen atoms, such as a fluorine atom, a chlorine atom and a bromine atom.

Examples of the cyclic olefin functionality siloxane expressed by the formula (1) are compounds given below, but the cyclic olefin functionality siloxane expressed by the formula (1) may not be limited to the examples given below, in the present disclosure. It is to be noted that Me is a methyl group, and Ph denotes a phenyl group (hereinafter, the same).

[Chemical 5]

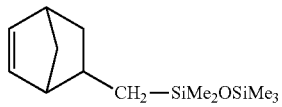

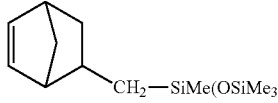

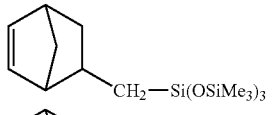

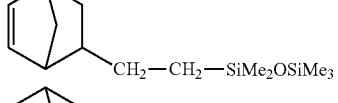

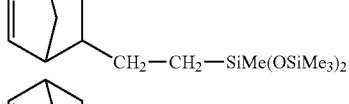

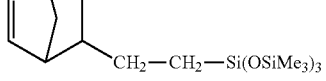

-continued

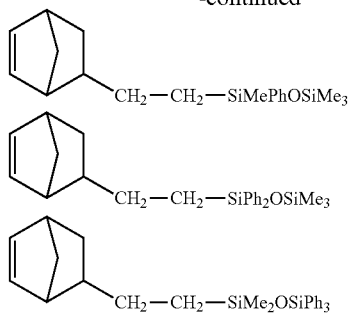

The cyclic olefin functionality siloxane expressed by the formula (1) may be used by one kind alone two or more kinds in combination.

The cyclic olefin functionality siloxane expressed by the formula (1) is produced by a method described below, for example, in a case where $R^1$ is a methyl group, i=0, j=2, and s=2 in the formula (1).

As shown in a reaction formula given below, 5-vinyl-bicyclo[2.2.1]hept-2-ene and corresponding SiH group-containing functionality siloxane can be synthesized by carrying out an addition reaction in the presence of platinum catalyst.

[Chemical 5]

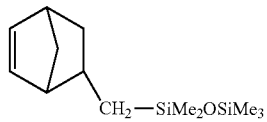

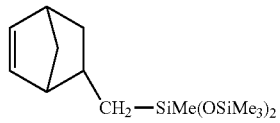

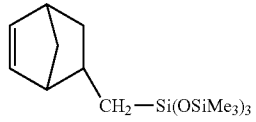

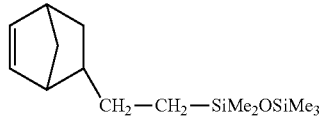

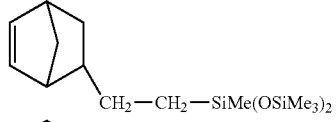

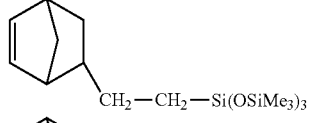

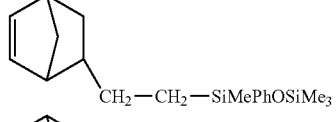

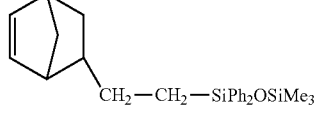

-continued

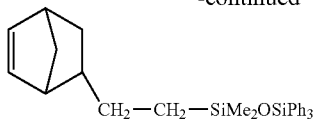

Next, j that is an important structural element of the cyclic olefin functionality siloxane expressed by the formula (1) will be described. j that shows the number of the alkyl chains in the formula (1) is the integer of 1 to 4, and is preferably 1 or 2.

In the cyclic olefin functionality siloxane of the present embodiment, the alkyl chain was introduced as a spacer for keeping a bulky silyl group and a cyclic olefin from each other. It is found that the mechanical strength, in particular, flexibility, of the high gas permeability cyclic olefin addition polymer of the present embodiment largely improves by the effect of the alkyl chain. Therefore, the asymmetric membrane 13 can be provided with flexibility by improving the elongation property of the asymmetric membrane 13. As the membrane is temporarily deformed by an external force, such as a pressure change, and releases the force, the membrane is restricted from being broken.

On the other hand, in the formula (2) described above, $A^1$ to $A^4$ are each independently a group selected from a hydrogen atom, halogen atoms, such as a fluorine atom, a chlorine atom, and a bromine atom, alkyl groups, such as a methyl group, an ethyl group, a propyl group, an isopropyl group, a butyl group, an isobutyl group, a tert-butyl group, a pentyl group, a neo pentyl group, a hexyl group, an octyl group, a nonyl group, and a decyl group, alkenyl groups, such as a vinyl group, an allyl group, a butenyl group, and a hexenyl group, cycloalkyl groups, such as a cyclohexyl group, aryl groups, such as a phenyl group, a tolyl group, a xylyl group, and a naphthyl group, alkoxy groups, such as a methoxy group, an ethoxy group, and a propoxy group, aryloxy groups, such as a phenoxy group, and halogenated hydrocarbon groups, such as a 3,3,3-trifluoropropyl group, a 2-(par fluorobutyl)ethyl group, a 2-(par fluorooctyl)ethyl group, and a p-chlorophenyl group, each having a carbon number of 1 to 10, or a polar substituent group selected from alkoxycarbonyl groups, such as an axetanyl group, an methoxycarbonyl group, and an tert-carbobutoxy group, preferably one having an alkoxy group with a carbon number of 1 to 10, particularly, 1 to 6. $A^1$ and $A^2$, or $A^1$ and $A^3$ may form, together with a carbon atom to which they are attached, an alicyclic structure, an aromatic ring structure, a carbon imide group, or an acid anhydride group.

In this case, examples of the alicyclic structure in the formula (2) include those having a carbon number of 4 to 10, and examples of the aromatic ring structure in the formula (2) include those having a carbon number of 6 to 12. These structures are exemplified as follows:

[Chemical 7]

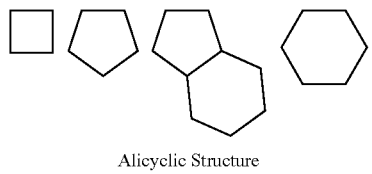

Alicyclic Structure

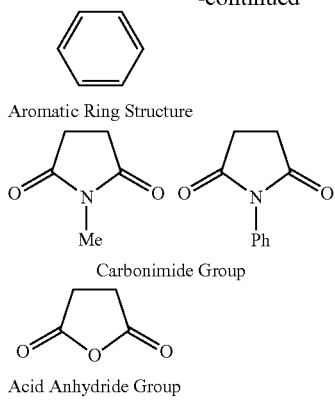

Aromatic Ring Structure

Carbonimide Group

Acid Anhydride Group

The followings are examples of these structures when bonded with a norbornene ring. The followings are examples when k=0 in the formula (2).

[Chemical 8]

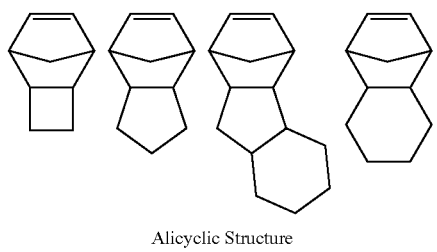

Alicyclic Structure

Aromatic Ring Structure

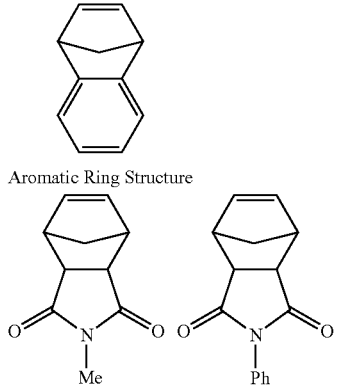

Carbonimide Group

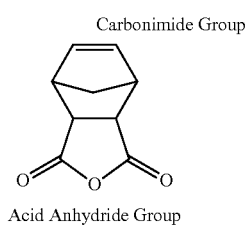

Acid Anhydride Group

Examples of the cyclic olefin compound expressed by the formula (2) include the following compounds, but the cyclic olefin compound expressed by the formula (2) of the present disclosure may not be limited to the following examples.

Examples of the cyclic olefin compound expressed by the formula (2) are bicyclo[2.2.1]hept-2-ene, 5-methyl-bicyclo [2.2.1]hept-2-ene, 5-ethyl-bicyclo[2.2.1]hept-2-ene, 5-propyl-bicyclo[2.2.1]hept-2-ene, 5-butyl-bicyclo[2.2.1]hept-2-ene, 5-pentyl-bicyclo[2.2.1]hept-2-ene, 5-hexyl-bicyclo

[2.2.1]hept-2-ene, 5-octyl-bicyclo[2.2.1]hept-2-ene, 5-decyl-bicyclo[2.2.1]hept-2-ene, 5-phenyl-bicyclo[2.2.1]hept-2-ene, 5-vinyl-bicyclo[2.2.1]hept-2-ene, 5-allyl-bicyclo[2.2.1]hept-2-ene, 5-isopropylidene-bicyclo[2.2.1]hept-2-ene, 5-cyclohexyl-bicyclo[2.2.1]hept-2-ene, 5-fluoro-bicyclo[2.2.1]hept-2-ene, 5-chloro-bicyclo[2.2.1]hept-2-ene, methyl bicyclo[2.2.1]hept-5-ene-2-carboxylate, ethyl bicyclo[2.2.1]hept-5-ene-2-carboxylate, butyl bicyclo[2.2.1]hept-5-ene-2-carboxylate, methyl 2-methyl-bicyclo[2.2.1]hept-5-ene-2-carboxylate, ethyl 2-methyl-bicyclo[2.2.1]hept-5-ene-2-carboxylate, propyl 2-methyl-bicyclo[2.2.1]hept-5-ene-2-carboxylate, trifluoroethyl 2-methyl-bicyclo[2.2.1]hept-5-ene-2-carboxylate, ethyl 2-methyl-bicyclo[2.2.1]hept-2-enylacetate, 2-methyl-bicyclo[2.2.1]hept-5-enyl acrylate, 2-methyl-bicyclo[2.2.1]hept-5-enyl methacrylate, dimethyl bicyclo[2.2.1]hept-5-ene-2,3-dicarboxylate, tricyclo[4.3.0.1$^{2,5}$]dec-3-ene, and tetracyclo[4.4.0.1$^{2,5}$.1$^{7,10}$]dodec-3-ene. These compounds may be used one kind alone or in combination with two or more kinds.

If a cyclic olefin compound expressed by the formula (2) includes a polar group such as an ester group, although the adhesive property of the obtained polymer to an adhered member and the solubility to an organic solvent improve, the gas permeability tends to reduce. Therefore, the cyclic olefin compound is preferably suitably selected according to a purpose.

Considering the gas permeability property of the obtained cyclic olefin addition polymer of the present disclosure, the cyclic olefin functionality siloxane expressed by the formula (1) described above and the cyclic olefin compound expressed by the formula (2) described above are preferably used to have a feed ratio so that the structural unit derived from the formula (1) is 5 to 100 mol %, more preferably, 10 to 100 mol % in total in the obtained polymer.

(II) Addition Polymer

The cyclic olefin addition polymer contains a repeating unit represented by the following formula (3) that is formed by addition polymerization of the cyclic olefin functionality siloxane expressed by the above-described formula (1) as a monomer

[Chemical 9]

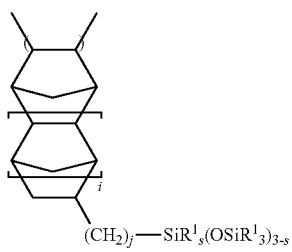

(3)

In the formula (3), $R^1$, i, j, and s are the same as those of the formula (1).

The cyclic olefin addition polymer of the present disclosure contains a repeating unit represented by the following formula (4) that is formed by addition polymerization of the cyclic olefin compound expressed by the formula (2) as a monomer.

[Chemical 10]

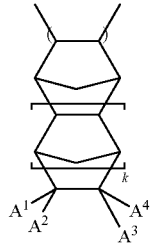

(4)

(In the formula (4), $A^1$ to $A^4$ and k are the same as those in the formula (2).)

For example, in a case where k is 0, and $A^1$ to $A^4$ are each hydrogen atom, the repeating unit expressed by the formula (4) indicates 2, 3 addition structural unit, but may include one having 2, 7 addition structural unit obtained by addition polymerization of the cyclic olefin compound expressed by the above-described formula (2) as a monomer. This structural unit is the same as the repeating unit expressed by the formula (3).

The rate of the structural unit expressed by the formula (3) is normally 5 to 100 mol %, preferably, 10 to 100 mol %, in the high gas permeability cyclic olefin addition polymer. When the rate of the structural unit expressed by the formula (3) is less than 5 mol %, the gas permeability is insufficient. Particularly, in terms of the gas permeability, the solubility to the organic solvent, and the mechanical strength, it is preferable that the structural unit derived from the formula (1) is contained at a rate of 50 to 100 mol % and the structural unit derived from the formula (2) is contained at a rate of 0 to 50 mol % in the cyclic olefin compound.

The structural units expressed by the formula (3) and the formula (4) may randomly exist or be unevenly distributed in the shape of a solid, in the high gas permeability cyclic olefin addition polymer.

The polymer has a number average weight molecular weight of preferably 10,000 to 2,000,000 and more preferably 50,000 to 1,500,000 in terms of polystyrene conversion measured by GPC (Gel Permeation Chromatography) using THF (tetrahydrofuran) as a solvent. A polymer having a molecular weight exceeding the upper limit is practically difficult to be synthesized. On the other hand, the strength of a membrane is likely to be deteriorated at a molecular weight of less than the lower limit.

According to an official method, the addition polymerization is carried out in such a manner that the above-described monomer composition is dissolved in an aromatic hydrocarbon solvent such as toluene or xylenes, and the obtained mixture is polymerized by stirring in an inert gas atmosphere in the presence of a polymerization catalyst and a promoter at a temperature of 20 to 40° C. under normal pressure. Examples of the polymerization catalyst can include metallocene complexes having a central metal selected from the elements of Group 8, Group 9, and Group 10 of the periodic table, such as iron (Fe), cobalt (Co), nickel (Ni), ruthenium (Ru), rhodium (Rh), palladium (Pd), and platinum (Pt), and preferably can include metallocene catalysts of nickel (Ni) or palladium (Pd). Organoaluminum compounds can be used as the promoter, and methyl aluminoxane is preferable.

The above-described catalyst and the above-described promoter are used within the following ranges.

The amount of the catalyst is preferably from 0.01 to 100 millimole atoms to a total of 1 mol of the monomers expressed by the formula (1) and the formula (2). The amount of the promoter is preferably 0.5 to 10,000 mole to 1 mol of the catalyst.

A molecular weight regulator may be added to the polymerization system when necessary. Examples of the molecular weight regulator include hydrogen, α-olefins such as ethylene, butene, and hexane, aromatic vinyl compounds, such as styrene, 3-methylstyrene, and divinylbenzene, unsaturated ethers such as ethyl vinyl ether, and vinyl silicon compounds such as tris(trimethylmethoxy)vinylsilane, divinyldihydrosilane, and vinylcyclotetrasiloxane.

The ratio of the above-described solvent to the monomer, the polymerizing temperature, polymerizing time, and the amount of the molecular weight regulator are significantly affected by the catalyst to be used, the structure of the monomer, and the like, and thus are difficult to be generally limited. Therefore, it is necessary to properly use these according to a purpose so as to obtain the polymer having the above-described specific structure.

The molecular weight of the polymer is regulated according to the amount of the polymerization catalyst, the amount of the molecular weight regulator to be added, a conversion rate from the monomer to the polymer, or the polymerizing temperature.

The polymerization is stopped by a compound selected from water, alcohols, ketones, organic acids, and the like. A catalyst residue can be separated and removed from a polymer solution by adding a mixture of alcohol and water with acids such as lactic acid, malic acid, and oxalic acid to the polymer solution. Further, to remove the catalyst residue, adsorption removal using activated carbon, diatomaceous earth, alumina, silica or the like, and filtering separation and removal by a filer or the like can be employed.

The polymer can be obtained by placing the polymerization solution in an alcohol such as methanol and ethanol or a ketone such as acetone and methyl ethyl ketone, solidifying the polymerization solution, and drying the polymerization solution normally for 6 to 48 hours at 60 to 150° C. under a reduced pressure. In this step, the catalyst residue and the unreacted monomer remaining in the polymer solution are also removed. The unreacted monomer containing siloxane can be easily removed by using a solvent that is obtained by mixing cyclic polysiloxanes such as octamethylcyclotetrasiloxane and decamethylcyclopentasiloxane with the alcohols or ketones.

(iv) Filler

The fillers are preferably dispersed in the above-described polymeric material from a viewpoint of improvement of gas permeability.

As the fillers, an organic filler or an inorganic filler can be used. Although the filler may have a hydrophilic surface or a hydrophobic surface, an inorganic filler having a hydrophilic surface is particularly preferable. Examples of such an inorganic filler include oxide based fillers made of oxides such as silica, zeolite, alumina, titanium oxide, magnesium oxide, and zinc oxide. Of these, silica based fillers are preferable. Examples of the silica based fillers include spherical silica, capsule silica, porous silica particles, quartz powder, glass powder, glass bead, talc, and silica nanotubes.

In order to particularly increase gas permeability, the filler is preferably a porous filler. As the porous filler, mesoporous silica particles, nano porous silica particles, and zeolite particles are preferable. The mesoporous silica particles are porous silica particles having a particle diameter of 500 to 1000 nm, and the nano porous silica particles are porous silica particles having a particle diameter of 30 to 100 nm in which pores are formed. Generally, the mesoporous silica particles have a pore diameter of 3 to 7 nm, and the nano porous silica particles have a pore diameter of 2 to 5 nm. It is considered that use of the filler having a low apparent density like the porous filler greatly improves performance of the asymmetric membrane.

A filler subjected to surface treatment using a coupling agent or the like or hydrophilization by hydration treatment may be used when necessary.

A content of the filler is typically from 5 to 500 parts by mass relative to 100 parts by mass of the above-described polymeric material. The content of the filler is more preferably not less than 11 parts by mass, still more preferably not less than 30 parts by mass, and particularly preferably from 70 to 400 parts by mass. If the content of the filler is less than 5 parts by mass, the effect of improving the gas permeability tends to reduce. If the content of the filler exceeds 500 parts by mass, the mechanical strength of the asymmetric membrane reduces, and it becomes difficult to reduce the thickness of the asymmetric membrane.

(V) Method for Producing Asymmetric Membrane

For example, the above-described asymmetric membrane can be obtained by a method including a step of applying the above-described polymeric material onto a base material to form a solution layer, a step of partially removing a solvent from the solution layer to form a dense layer containing the polymeric material on a surface layer portion of the solution layer opposite to the base material, and a step of immersing the solution layer having the dense layer formed into a poor solvent (solidifying solvent) of the polymeric material to form a porous layer containing the polymeric material.

As a solvent that dissolves the polymeric material, aromatic hydrocarbons, aliphatic hydrocarbons, halogenated hydrocarbons, ethers, or ketones are preferably used. Examples of the aromatic hydrocarbons include benzene, toluene, and xylenes. Examples of the aliphatic hydrocarbons include hexane, heptane, octane, decane, and cyclohexane. Examples of halogenated hydrocarbons include chloroform, methylene chloride, and carbon tetrachloride. Examples of the ethers include tetrahydrofuran and dioxide. Examples of the ketones include ethyl methyl ketone.

In preparation of the polymer solution, film formation is often performed by adding other substance in order to enhance phase separation or to adjust solubility of the polymer, and viscosity of the polymer solution. As such a film-forming regulator, a compound having a compatibility of not less than 0.1% of the polymer solution can be used. As the regulator, salts soluble in the polymer solution, water, lower alcohols (methanol and ethanol), amide based polar solvents (dimethylformamide and dimethylacetamide) or the like can be used.

In formation of the dense layer, conditions on removal of the solvent (a drying method, a temperature, a time, and the like) are suitably regulated so as to form the dense layer having a desired thickness.

As the poor solvent (solidifying solvent) used in order to form the porous layer, alcohols such as methanol, ethanol and propanol, acetone, or water is preferably used.

The asymmetric membrane will not be limited to the embodiments described above, and modifications will be properly made without departing from the spirit of the present disclosure. For example, the asymmetric membrane may further include a mesh body. In this case, the mesh body may be impregnated into at least one of the porous layer or the dense layer. Alternatively, the mesh body may be laminated on the porous layer or the dense layer. The asymmetric membrane having the mesh body can be produced by impregnating the mesh body into the mixed solution described above or applying the mixed solution onto the mesh body, for example.

The mesh body can improve gas permeability, and can improve mechanical strength of the membrane to restrict breakage of the membrane due to an external force. The mesh body may be made of a metal or made of a resin, and the mesh body made of a resin is particularly preferable. Examples of the resin used to form the mesh body include polyester terephtarate (PET) and polypropylene (PP). Examples of methods for weaving the mesh include plain weave, twill weave, plain dutch weave, and twill dutch weave.

The surface of the mesh body is preferably treated using an adhesion promoter (primer) in order to improve strength of the asymmetric membrane. Commercially available adhesion promoters can be used for the adhesion promoter.

The asymmetric membrane may be formed on a support, or may be a hollow fiber membrane.

Second Embodiment

Figure 2:
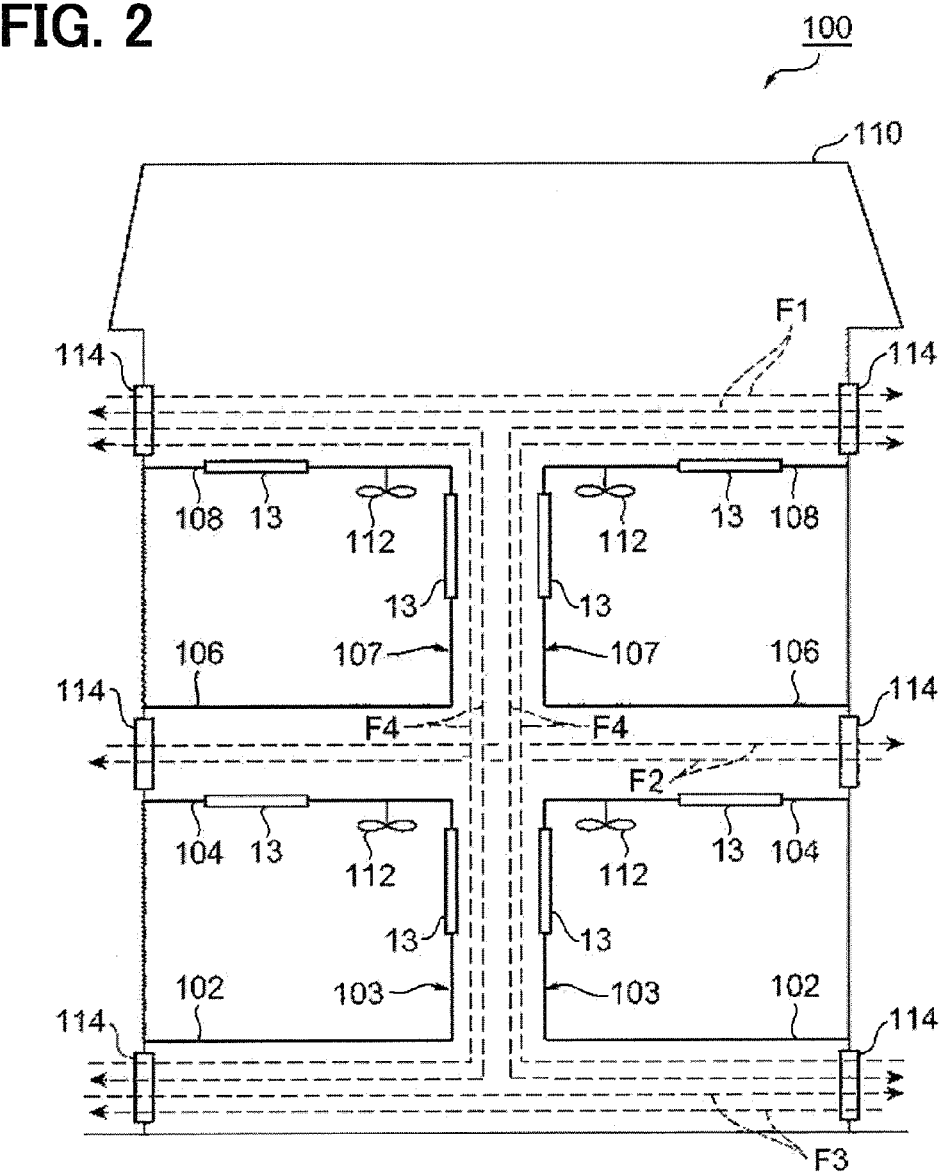
FIG. 2 is a cross-sectional view of a house to which an air conditioning system for a residential house according to a second embodiment is applied.

Next, a second embodiment in which the air conditioning system of the present disclosure is adapted to an air conditioning system for residential houses will be described. FIG. 2 is a schematic cross-sectional view of an air conditioning system 100 for residential houses in a two-story house 110 taken along a height direction of the house 110.

The air conditioning system 100 for residential houses include the permeable membrane 13 made of the above-described asymmetric membrane on a side wall 103 and a ceiling 104 of an interior (space to be air conditioned) of a first floor, a side wall 107 and a ceiling 108 of an interior (space to be air conditioned) of a second floor. The air conditioning system 100 for residential houses also includes a fan 112 in the interior of each floor. The air conditioning system 100 for residential houses further includes a pair of vents 114 under a floor 102 of the first floor, in between the first floor ceiling 104 and a floor 106 of the second floor, and above the second floor ceiling 108, and each pair of vents 114 being opposed to each other in a width direction of the house 110. The air conditioning system 100 for residential houses further includes a heating equipment (kerosene fan heater) (not shown) in the interior of each floor (inside of the space to be air conditioned).

The interior of each floor is substantially shut off from the outside air at parts other than the permeable membrane 13. Namely, the air inside of the interior of each floor contacts the outside air that is introduced into the house 110 from the vent 114 only through the permeable membrane 13. Between the respective pairs of the vents 114, air flows F1, F2, F3, and F4 are formed. These air flows cause the outside air to be supplied into the interior, and cause the air discharged from the interior to be discharged to the outside.

When the kerosene fan heater is operated in the interior of each floor, an $O_2$ concentration in the interior reduces and a $CO_2$ concentration increases with combustion of kerosene. Further, CO generated by incomplete combustion of kerosene and VOC diffused from building materials or interior materials of the house 110 exist in the interior. Therefore, the inside air has a lower concentration of $O_2$ and higher concentrations of $CO_2$, CO and VOC concentrations than those of the outside air. Due to such concentration differences between the inside air and the outside air, $O_2$ in the outside air is introduced into the interior through the permeable membrane 13, and $CO_2$, CO and VOC are discharged to the outside through the permeable membrane 13. Such introduction of $O_2$ and discharge of $CO_2$, CO and VOC (gas exchange) through the permeable membrane 13 are performed until the difference of each the concentrations of $O_2$, $CO_2$, CO, and VOC is eliminated. As a result, the inside air and the outside air can have uniform concentrations of $CO_2$, CO, and VOC.

In the air conditioning system 100 for residential houses, efficiency of the gas exchange described above can be improved by circulating the air inside of the interior by the fan 112. Further, the gas exchange can be accelerated by the air flows F1, F2, F3, and F4 flowing between the respective pairs of the vents 114.

In the air conditioning system 100 for residential houses, among gases that exist in the interior, only a gas a concentration of which is different from that of the outside air is selectively exchanged through the permeable membrane 13, and the amount of gas permeating through the membrane is limited to the amount needed to eliminate the difference of the gas concentration between both sides of the permeable membrane 13 so that the gas exceeding the amount does not permeate the membrane. Namely, the air conditioning system 100 for residential houses does not perform excessive ventilation. As a result, heat loss of the air conditioning system 100 for residential houses caused by ventilation can be reduced. For example, $CO_2$ and CO caused by the kerosene fan heater and harmful gases (a deteriorated part of an inside air composition), such as VOC diffused by building materials or interior materials generated in the interior are estimated to be at most 3% of the total of the inside air. Here, assuming that the total amount of the gases to be exchanged between the interior and the outside air, heat loss is 3%. Therefore, the heat loss can be reduced, as compared with a conventional 24-hour ventilation system for residential houses. Also in a case where the air conditioning system 100 for residential houses includes a refrigerated air conditioning equipment in the interior (inside of the space to be air conditioned) of each floor, heat loss of the air conditioning system 100 for residential houses can be reduced.

Further, in the air conditioning system 100 for residential houses, since the discharge and the introduction of the gases are performed through the permeable membrane 13 made of the above-described asymmetric membrane, it is possible to restrict the suspended matters in the atmosphere, such as SPM and nSPM, from flowing into the interior.

For example, an installation area of the permeable membrane 13 may be set to such an extent that $O_2$ having a largest amount of exchange needed between the interior and the outside air can be exchanged sufficiently. For example, in a case where the space to be air conditioned by the air conditioning system 100 for residential houses has a size of 6 mats (10.94 m$^2$)×ceiling height of 2.4 m, a volume of the space to be air conditioned is 26.26 m$^3$. Assuming that an amount of consumption of $O_2$ by the kerosene fan heater is 1.2% per hour, the total amount of $O_2$ consumed per hour by the kerosene fan heater within the space to be air conditioned is 26.26 m$^3$×1.2%/h=0.315 m$^3$/h. The amount of consumption of $O_2$ per person is approximately 0.0244 m$^3$/h. Therefore, the amount of consumption of $O_2$ per hour within the space to be air conditioned when the kerosene fan heater is operated in the state that four persons exist within the space to be air conditioned of the size of 6 mats is 0.315 m$^3$/h+0.0244 m$^3$/h×4=0.4126 m$^3$/h. Here, assuming that a permeability of $O_2$ in the permeable membrane 13 is 0.5×10$^{-2}$ cm$^3$/sec/cm$^2$=0.18 m$^3$/h/m$^2$, an installation area of the permeable membrane 13 needed to permeate $O_2$ of the amount equivalent to the amount of consumption of $O_2$ per hour within the space to be air conditioned is 0.4126 m$^3$/h÷0.18 m$^3$/h/m$^2$=2.29 m$^2$ (approximately, 1.5 m×1.5 m). From a viewpoint of securing the area in which the permeable membrane 13 of this size can be installed, an installation location of the permeable membrane 13 is preferably a side wall or a ceiling of the interior (the space to be air conditioned). $CO_2$ and VOC each having a concentration lower than that of $O_2$ in the interior can be exchanged sufficiently with the permeable membrane 13 having the above-described area.

The thickness of the permeable membrane 13 is preferably from 0.1 to 10 μm.

Third Embodiment

Figure 3:
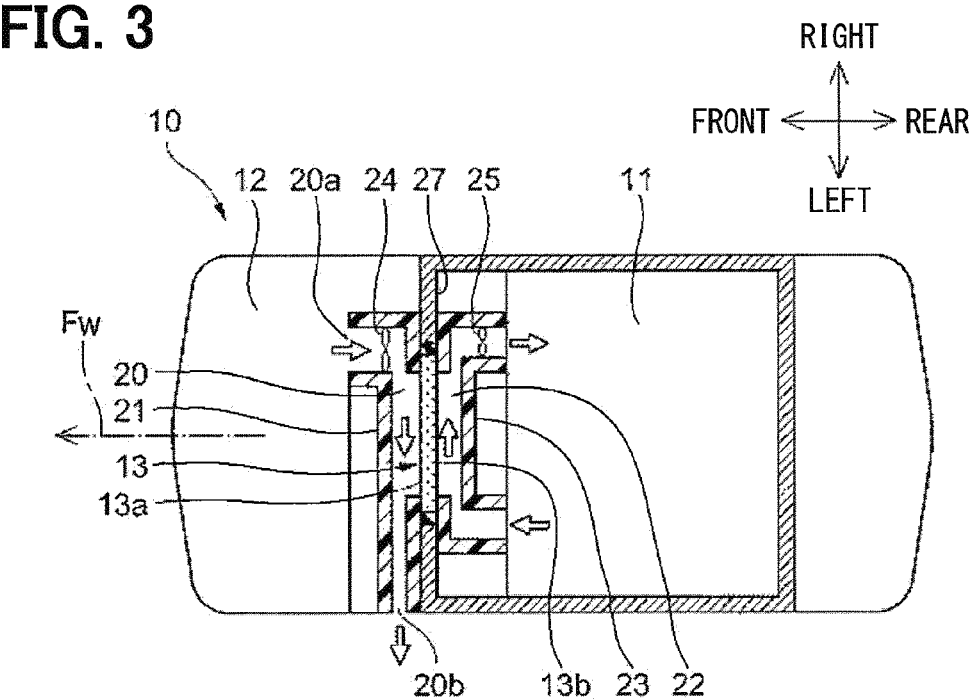
FIG. 3 is a schematic diagram of a vehicle to which an air conditioning system for a vehicle according to a third embodiment is applied.

Next, a third embodiment in which the air conditioning system of the present disclosure is adapted to an air conditioning system for vehicles will be described. FIG. 3 is a schematic cross-sectional view of a vehicle 10 on which the air conditioning system for vehicles according to the third embodiment is mounted. In FIG. 3, front and rear, and left and right arrows denote respective direction of the vehicle 10, and an arrow Fw denotes a forward direction of the vehicle 10.

At a front end part of a passenger compartment 11 on which passengers board (area surrounded by a thick solid line in FIG. 3), a partition wall (firewall) that separates the passenger compartment 11 from an engine compartment 12 is provided. A through hole is formed at a part of the partition wall 27 to pass through the partition wall 27 from a side of the passenger compartment 11 to a side of the engine compartment 12. The through hole is covered with the permeable membrane 13.

In the engine compartment 12, an outside air duct 21 that forms an outside air passage 20 through which outside air flows is disposed along the partition wall 27. In the passenger compartment 11, an inside air duct 23 that forms an inside air passage 22 through which inside air flows is disposed along the partition wall 27.

Each of the outside air duct 21 and the inside air duct 23 has a through hole at a part of a wall thereof. The outside air duct 21 and the inside air duct 23 are disposed on the partition wall 27 such that the through holes correspond to the permeable membrane 13.

In other words, the permeable membrane 13 is disposed at a boundary between the outside air passage 20 and the inside air passage 22 such that one surface 13a of the permeable membrane 13 (surface adjacent to the engine compartment 12) exposes into the outside air passage 20 to contact with the outside air and the other surface 13b (surface adjacent to the passenger compartment 11) exposes into the inside air passage 22 to contact with the inside air.

An outside air blower 24 is disposed in the outside air passage 20 to generate a flow of the outside air and to supply the outside air to the one surface 13a of the permeable membrane 13. An inside air blower 25 is disposed in the inside air passage 22 to generate a flow of the inside air and to supply the inside air to the other surface 13b of the permeable membrane 13.

The outside air blower 24 and the inside air blower 2 are the one that has a compression ratio of less than two, among fluid machines that give kinetic energy to a gas or increases pressure, in particular, are a fan, a blower, or the like.

The outside air duct 21 is formed with an outside air inlet portion 20a to introduce the outside air into the outside air passage 20, and an outside air outlet portion 20b to discharge the outside air from the outside air passage 20.

The outside air inlet portion 20a and the outside air outlet portion 20b are configured such that a pressure (total pressure) P1 at the outside air inlet portion 20a, a pressure (total pressure) P2 at the outside air outlet portion 20b, and a pressure Pv of air blown by the outside air blower 24 satisfy a pressure relationship described next.

Namely, the outside air inlet portion 20a and the outside air outlet portion 20b are configured such that a pressure difference (P2−P1) obtained by subtracting the pressure P1 of the inlet portion from the pressure P2 of the outlet portion is equal to or less than the pressure Pv of the blown air both when the vehicle is stopped and when the vehicle is traveling. In other words, the pressure P1 of the inlet portion, the pressure P2 of the outlet portion, and the pressure Pv of the blown air satisfy a relationship of P2−P1 Pv both when the vehicle is stopped and when the vehicle is traveling.

In the example of FIG. 3, the outside air inlet portion 20a is open in the vehicle forward direction, and the outside air outlet portion 20b is open in a vehicle leftward direction. Therefore, the outside air outlet portion 20b is less affected by a travelling wind (dynamic pressure) when the vehicle travels than the outside air inlet portion 20a. As a result, the above-described pressure relationship is satisfied.

Operations of the outside air blower 24 and the inside air blower 25 are controlled by a non-illustrated air conditioner control unit (ECU). The air conditioner control unit is constructed of a known microcomputer including a CPU, a ROM and a RAM, and its peripheral circuits. The air conditioner control unit performs various computations and processing based on control programs stored in the ROM to control operations of electric devices, such as the outside air blower 24 and the inside air blower 25.

Next, the operation in the above-described configuration will be described. When the air conditioner control unit operates the outside air blower 24 and the inside air blower 25, the flow of the outside air is generated in the outside air passage 20, and the flow of the inside air is generated in the inside air passage 22.

In this case, when a concentration of a certain component in the inside air of the inside air passage 22 is lower than a concentration of the component in the outside air of the outside air passage 20, the component in the outside air permeates through the permeable membrane 13 due to the concentration difference of the component, and mixes with the inside air. Therefore, the concentration of the component in the inside air increases.

Conversely, when a concentration of a certain component in the inside air of the inside air passage 22 is higher than a concentration of the component in the outside air of the outside air passage 20, gas of the component in the inside air permeates through the permeable membrane 13 due to the concentration difference of the component, and mixes with the outside air. Therefore, the concentration of the component in the inside air reduces.

For example, when oxygen is consumed by breathing of a passenger within the passenger compartment 11 and the concentration of oxygen in the inside air is reduced, oxygen in the outside air of the outside air passage 20 permeates through the permeable membrane 13 and mixes with the inside air of the inside air passage 22. Therefore, the concentration of oxygen in the inside air increases.

Also, when carbon dioxide is generated by the breathing of the passenger within the passenger compartment 11 and the concentration of carbon dioxide in the inside air increases, carbon dioxide in the inside air of the inside air passage 22 permeates through the permeable membrane 13 and mixes with the outside air in the outside air passage 20. Therefore, the concentration of carbon dioxide of the inside air reduces. As such, the concentration of oxygen and the concentration of carbon dioxide within the passenger compartment 11 can be kept at concentrations comfortable for the passenger. Likewise, an odor gas, such as body odor, can be reduced.

On the other hand, liquids and solids in the outside air of the outside air passage 20 do not permeate through the permeable membrane 13 at all or only slightly permeate through the permeable member 13. Therefore, the permeable membrane 13 restricts the entry of these liquids and solids to the inside air passage 22.

Further, in conventional vehicles, the window is fogged when a temperature outside of the passenger compartment is low, for example, in the winter season, and humidity of the inside air increases due to vapor generated by the breathing of a passenger within the passenger compartment 11. Since the fogging of the window interferes with driving, the outside air is introduced so as to restrict the fogging. In this case, heat loss occurs in a heating operation due to the ventilation. In the present embodiment, on the other hand, the vapor in the inside air of the inside air passage 22 permeates through the permeable membrane 13 and mixes with the outside air of the outside air passage 20. Therefore, the humidity of the inside air can be reduced, and the fogging of the window can be restricted. As such, necessity of introduction of the outside air is reduced, and the heat loss due to the ventilation can be suppressed, resulting in energy saving and reduction in side of the air conditioning device.

In the present embodiment, since the outside air blower 24 and the inside air blower 25 are provided, fresh outside air and inside air can be supplied to the permeable membrane 13 without stagnating the outside air and the inside air in the vicinity of the permeable membrane 13.

In the present embodiment, further, the pressure P1 of the inlet portion, the pressure P2 of the outlet portion, and the pressure Pv of the blown air satisfy the pressure relationship of P2−P1 Pv both when the vehicle is stopped and when the vehicle is traveling. Therefore, a flow direction of the outside air in the outside air passage 20 can be made from the outside air inlet portion 20a toward the outside air outlet portion 20b both when the vehicle is stopped and when the vehicle is traveling.

In other words, the flow direction of the outside air in the outside air passage 20 can be fixed both when the vehicle is stopped and when the vehicle is traveling. Therefore, stagnation and reverse flow of the outside air in the outside air passage 20 can be restricted, and fresh outside air can be stably supplied to the permeable membrane 13.

As a result, since deterioration in permeability of the permeable membrane 13 due to the stagnation of the outside air and the inside air in the vicinity of the permeable membrane 13 can be reduced both when the vehicle is stopped and when the vehicle is traveling, the permeability of the permeable membrane 13 can be stably exerted.

When odors and harmful gases contained in exhaust gas discharged from the vehicle and odors around the engine flow in the outside air passage 20 and stagnate for a long time, these odors and harmful gases permeate through the permeable membrane 13 and easily enter the passenger compartment 11. In the present embodiment, however, since the fresh air is supplied to the permeable membrane 13, the entry of these odors and harmful gases to the passenger compartment 11 can be reduced.

In the example of FIG. 3, the outside air inlet portion 20a of the outside air passage 20 is directed to the vehicle frontward direction, and the outside air outlet portion 20b of the outside air passage 20 is directed to the vehicle leftward direction such that the pressure P1 of the inlet portion, the pressure P2 of the outlet portion, and the pressure Pv of the blown air satisfy the pressure relationship of P2−P1 Pv also when the vehicle is traveling. However, the configuration of the outside air inlet portion 20a and the outside air outlet portion 20b for satisfying the above-described pressure relationship is not limited to this example.

For example, an angle defined between the vehicle forward direction Fw and an opening direction that the outside air inlet portion 20a opens is referred to as an inlet opening angle, and an angle defined between the vehicle forward direction Fw and an opening direction that the outside air outlet portion 20b opens is referred to as an outlet opening angle. When the outside air inlet portion 20a and the outside air outlet portion 20b are configured to have an arrangement relationship where the inlet opening angle is equal to or less than the outlet opening angle, the pressure P1 of the inlet portion can be higher than the pressure P2 of the outlet portion by a predetermined amount, and the above-described pressure relationship can be satisfied.

In a case where a plurality of the outside air inlet portions 20a and a plurality of the outside air outlet portions 20b are provided, and those opening directions are different from each other, an average angle of the inlet opening angles and an average angle of the outlet opening angles may be compared with each other.

The average angle is calculated as follows. Namely, for example, the average angle of the inlet opening angles is a value obtained by first calculating a product of the opening angle and an opening area in each of the outside air inlet portions 20a, adding the products, and subsequently dividing the added product by the total opening area. The average angle of the outlet opening angles can be calculated in a similar manner.

As the configuration of the outside air inlet portion 20a and the outside air outlet portion 20b for satisfying the above-described pressure relationship, for example, the outside air inlet portion 20a and the outside air outlet portion 20b may be configured to have an area relationship in which an opening area of the outside air inlet portion 20a is equal to or greater than an opening area of the outside air outlet portion 20b.

In this configuration, because pressure loss in the outside air inlet portion 20a can be smaller than pressure loss in the outside air outlet portion 20b, the pressure P1 of the inlet portion can be higher than the pressure P2 of the outlet portion by a predetermined amount. Therefore, the above-described pressure relationship can be satisfied.

Also, the above-described arrangement relationship and the above-described area relationship of the outside air inlet portion 20a and the outside air outlet portion 20b may be combined.

As apparent from the description above, in the present embodiment, the permeating function of the permeable membrane 13 is realized without providing a large pressure difference between the outside air side and the inside air side of the permeable membrane 13 by a pressure difference generating device, such as a vacuum pump.

Specifically, the air conditioning system operates in the range of pressure fluctuation such that a pressure (ram pressure) caused by the traveling wind of the vehicle and a pressure of the blower 23 having a compression ratio of less than two are applied to a general atmospheric pressure. More specifically, the air conditioning system operates in the range where the pressure difference between the outside air side and the inside air side of the permeable membrane 13 is equal to or less than 5 kPa.

Fourth Embodiment

Next, a fourth embodiment in which the air conditioning system of the present disclosure is adapted to an air conditioning system for vehicles will be described.

Figure 4:
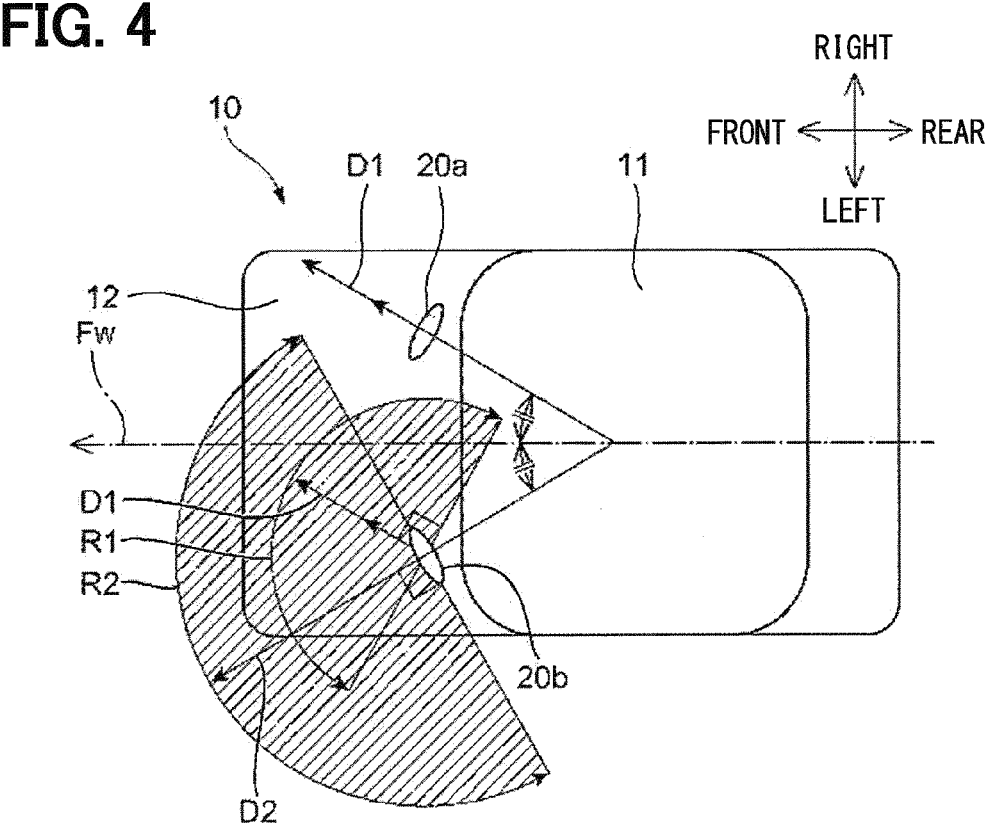
FIG. 4 is a schematic diagram of a vehicle to which an air conditioning system for a vehicle according to a fourth embodiment is applied.

FIG. 4 is a schematic diagram of a vehicle on which the air conditioning system for vehicles according to the fourth embodiment is mounted. In FIG. 4, front and rear, and left and right arrows denote respective directions of the vehicle, and an arrow Fw denotes a forward direction of the vehicle.

In the fourth embodiment shown in FIG. 4, the difference (P2−P1) between the pressure P2 of the outlet portion and the pressure P1 of the inlet portion when the vehicle is traveling is smaller than that of the above-described third embodiment. In particular, a degree of the traveling wind received in the outside air outlet portion 20b is set closer to that received in the outside air inlet portion 20a.

For example, the degree of the traveling wind received in the outside air outlet portion 20b is set closer to that received in the outside air inlet portion 20a by setting the opening direction of the outside air outlet portion 20b in a first range R1 or a second range R2, as shown in FIG. 4.

The first range R1 is a range of direction where the direction makes an angle equal to or less than 90 degree with the opening direction D1 of the outside air inlet portion 20a when viewed from any of the side of the vehicle, the top of the vehicle and the front of the vehicle.

The second range R2 is a range of direction where the direction makes an angle equal to or less than 90 degree with a direction D2 symmetrical to the opening direction D1 of the outside air inlet portion 20a when viewed from any of the side of the vehicle, the top of the vehicle, and the front of the vehicle. In FIG. 4, the first range R1 and the second range R2 when viewed from the top of the vehicle are shown for the sake of easy understanding.

In the above-described third embodiment, the difference (P2−P1) between the pressure P2 of the outlet portion and the pressure P1 of the inlet portion fluctuates to some extent by presence of the traveling wind. Therefore, the amount of wind flowing in the outside air passage 20 fluctuates to some extent between the time when the vehicle is stopped and the time when the vehicle is traveling, and thus the gas permeability of the permeable membrane 13 also fluctuates to some extent between the time when the vehicle is stopped and the time when the vehicle is traveling.

In consideration of this point, in the present embodiment, the difference (P2−P1) between the pressure P2 of the outlet portion and the pressure P1 of the inlet portion is made smaller. Therefore, the fluctuation of the difference (P2−P1) between the pressure P2 of the outlet portion and the pressure P1 of the inlet portion between the time when the vehicle is stopped and the time when the vehicle is traveling can be reduced, and thus the gas permeability of the permeable membrane 13 can be mode stably exerted.

Fifth Embodiment

Next, a fifth embodiment in which the air conditioning system of the present disclosure is adapted to an air conditioning system for vehicles will be described.

Figure 5:
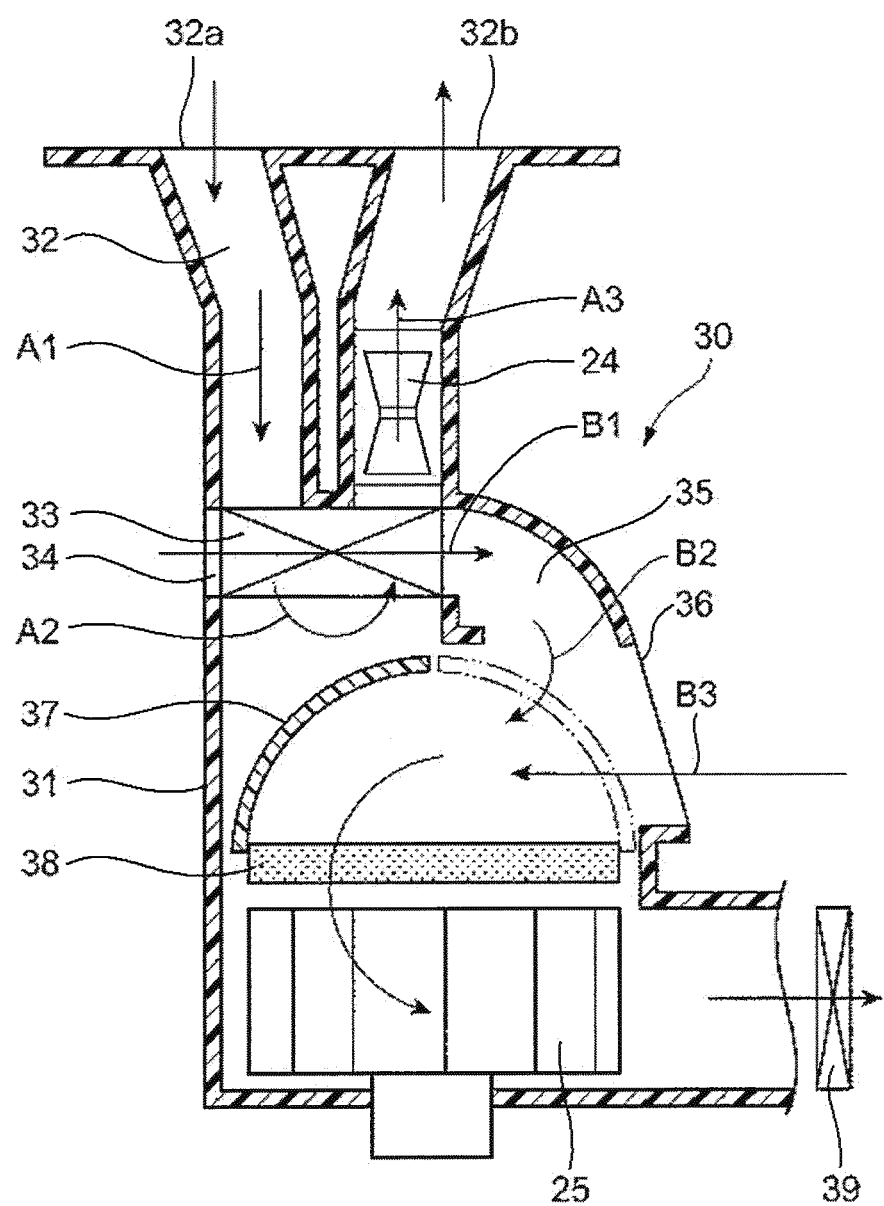
FIG. 5 is a cross-sectional view of an air conditioning device for a vehicle according to a fifth embodiment.

FIG. 5 is a cross-sectional view of an air conditioning device for vehicles according to the fifth embodiment. In the fifth embodiment, as shown in FIG. 5, a permeable membrane module 33 in which the permeable membrane 13 is integrated is used, and the inside air blower 25 is also used as an air conditioner blower of an air conditioning device 30 for vehicles.

An air conditioner case 31 of the air conditioning device 30 for vehicles is disposed inside of an instrument panel (not shown) arranged at a frontmost part of the passenger compartment 11. The air conditioner case 31 forms a passage through which the inside air flows.

The air conditioner case 31 is molded of a resin having certain degree of elasticity and excellent mechanical strength, such as polypropylene.

A substantially U-shaped outside air passage 32 through which the outside air flows while turning in a U-shape as shown by arrows A1 to A3, an outside air inlet portion 32a to introduce the outside air into the outside air passage 32, an outside air outlet portion 32b to discharge the outside air from the outside air passage 32 are formed at an upstream portion of the air conditioner case 31.

The outside air blower 24 is disposed at a portion downstream of a bent of the U-shape of the outside air passage 32 (on a side adjacent to the outside air outlet portion 32b).

The permeable membrane module 33 in which the permeable membrane is integrated is disposed at the bent of the U-shape of the outside air passage 32. The inside air blower (air conditioner blower) 25 is disposed at a portion opposite to the outside air inlet portion 32a and the outside air outlet portion 32b with respect to the permeable membrane module 33 (lower portion in FIG. 5), within the air conditioner case 31.

Figure 6:
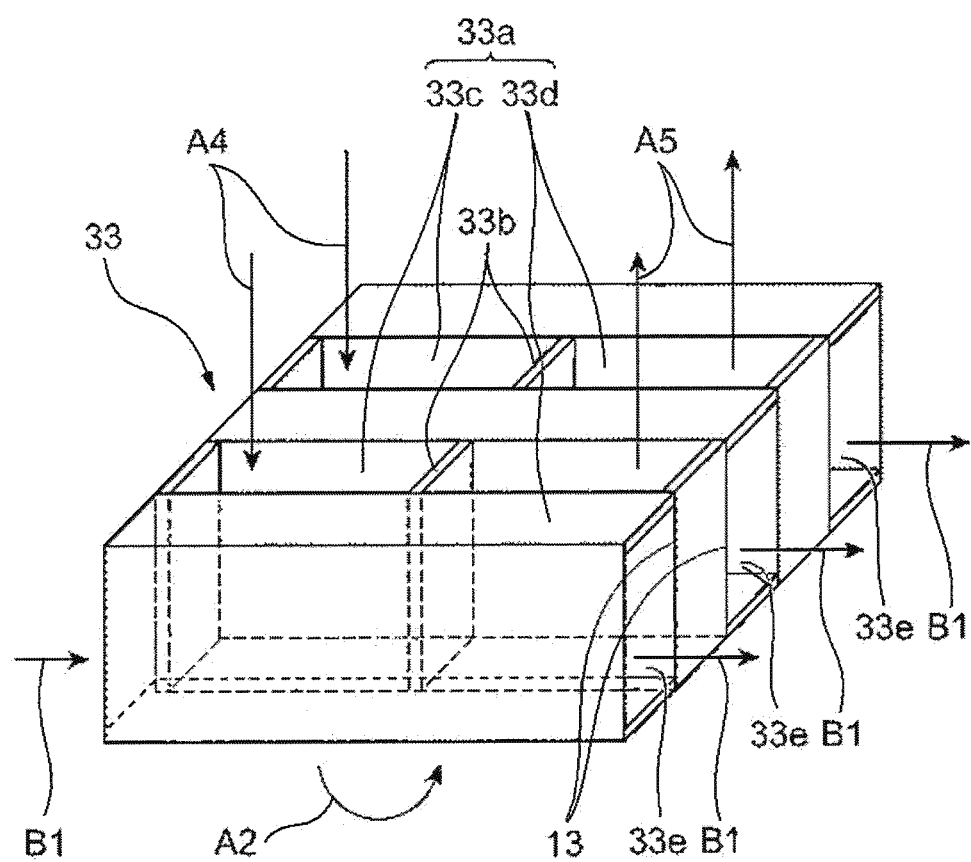
FIG. 6 is a perspective view of a permeable membrane according to the fifth embodiment.

FIG. 6 is a perspective view of the permeable membrane module 33. As shown in FIG. 6, the permeable membrane module 33 is formed into a rectangular parallelepiped shape as a whole. The permeable membrane module 33 is formed with outside air circulation spaces 33a through which the outside air flows as shown by arrows A4 and A5. In particular, the outside air circulation spaces 33a are divided into two spaces, that is, first spaces 33c and second spaces 33d, by separation plates 33b.

The outside air flows through the first space 33c from a side adjacent to the outside air inlet portion 32a to a side opposite to the outside air inlet portion 32a (from the top to the bottom in FIG. 6) as shown by the arrow A4. The outside air flowing out from the first space 33c makes a U-turn as shown by the arrow A2, and then flows through the second space 33d from the side opposite to the outside air outlet portion 32b to the side adjacent to the outside air outlet portion 32b (from the bottom to the top in FIG. 6) as shown by the arrow A5.

Further, the permeable membrane module 33 is formed with inside air circulation spaces 33e through which the inside air flows to pass through the permeable membrane module 33 in a direction (left and right direction in FIG. 6) perpendicular to the outside air circulation spaces 33a, as shown by arrows B1. The inside air circulation spaces 33e are formed adjacent to the outside air circulation spaces 33a. In the example of FIG. 6, a plurality of the outside air circulation spaces 33a and a plurality of the inside air circulation spaces 33e are alternately formed in the permeable membrane module 33.

In the permeable membrane module 33, separating portion between the outside air circulation spaces 33a and the inside air circulation spaces 33e are made of the permeable membrane 13, and a remaining portion is made of a material such as a resin.

The air conditioner case 31 is formed with a first inside air introduction port 34 and an inside air passage 35 at sides of the permeable membrane module 33. The first inside air introduction port 34 introduces the inside air into the inside air circulation spaces 33e of the permeable membrane module 33. The inside air flowing out from the inside air circulation spaces 33e flows while making a U-turn.

The air conditioner case 31 is formed with a second inside air introduction port 36 at a downstream position of the inside air passage 35 to introduce the inside air to the air conditioner bower 25 as shown by an arrow A3.

An inside and outside air switching door 37 is disposed in the air conditioner case 31 to switch between an inside air circulation mode and an outside air introduction mode. In the example of FIG. 5, a rotary door is used as the inside and outside air switching door 37.

In the inside air circulation mode, the inside and outside air switching door 37 is rotationally operated to a position shown by a solid line in FIG. 5 to close the outside air passage 32 and to open the inside air passage 35. Therefore, the inside air introduced from the first inside air introduction port 34 and the second inside air introduction port 36 are introduced to the air conditioner blower 25.

In the inside air circulation mode, the outside air flowing in the outside air passage 32 from the outside air inlet portion 32a as shown by the arrow A1 passes through the outside air circulation spaces 33a of the permeable membrane module 33 as shown by the arrow A4. The outside air then makes a U-turn on the outer side of the inside and outside air switching door 37 as shown by the arrow A2, and passes through the second spaces 33d of the outside air circulation space 33a of the permeable membrane module 33 as shown by the arrow A5. Further, the outside air flows toward the outside air outlet portion 32b as shown by the arrow A3, and flows out from the outside air passage 32.

In the outside air introduction mode, the inside and outside air switching door 37 is rotationally operated to a position shown by a double-dashed chain line in FIG. 5 to open the outside air passage 32 and to close the inside air passage 35. Therefore, the outside air flowing in the outside air passage 32 from the outside air inlet portion 32a passes through the first spaces 33c of the outside air circulation spaces 33a of the permeable membrane module 33 as shown by the arrow A4, flows toward the air conditioner blower 25 without making a U-turn, and is introduced into the air conditioner blower 25.

Although an illustration is omitted, the inside and outside air switching door 37 is driven by a servomotor that is controlled by the air conditioner control unit or a manual operation mechanism manually operated by a passenger.

In the example of FIG. 5, a filter 38 is disposed immediately above the air conditioner blower 25 within the air conditioner case 31 to remove dusts and odors in the air.

A heat exchanger 39 is disposed downstream of the air conditioner blower 25 within the air conditioner case 31 to perform at least one of cooling and heating of the air blown by the air conditioner blower 25. In this example, as the heat exchanger 39, a cooling heat exchanger for cooling the blown air and a heating heat exchanger for heating the blown air are disposed within the air conditioner case 31.

Although an illustration is omitted, in this example, an air mix door or the like is disposed within the air conditioner case 31. The air conditioner case 31 adjusts a temperature of air blown into the passenger compartment 11 by adjusting an air volume ratio of a heating air passing though the heating heat exchanger and a cooling air bypassing the heating heat exchanger.

Although an illustration is omitted, a plurality of blowing-out openings is formed at a downstream-most position of the air conditioner case 31 to blow a conditioned air to a predetermined region of the passenger compartment 11. A blowing-out mode door is disposed within the air conditioner case 31 to open and close the plurality of blowing-out openings.

In the present embodiment, in the inside air circulation mode, since the outside air circulates through the outside air circulation spaces 33a of the permeable membrane 33, the outside air can be supplied to one surface of the permeable membrane 13. Since the inside air circulates through the inside air circulation spaces 33e of the permeable membrane 33, the inside air can be supplied to the other surface of the permeable membrane 13. Therefore, similar to each of the embodiments described above, the concentrations of oxygen and the concentration of carbon dioxide of the passenger compartment 11 can be kept at comfortable concentrations.

Since the inside air blower 25 is also used as the air conditioner blower of the air conditioning device 30 for vehicles, the size and the costs of the air conditioning device 30 for vehicles can be reduced.

Further, the outside air passage 32 functions to supply the outside air to the permeable membrane 13 in the inside air circulation mode, and functions as the outside air introduction passage to introduce the outside air to the air conditioner blower 25 in the outside air introduction mode. Therefore, the size and the costs of the air conditioning device 30 for vehicles can be reduced, as compared with the case where the passage to supply the outside air to the permeable membrane 13' and the outside air introduction passage to introduce the outside air to the air conditioner blower 25 are separately provided.

Since the filter 38 is disposed in the air conditioner case 31, odors entering the passenger compartment through the permeable membrane 13 can be effectively removed.

Sixth Embodiment

Next, a sixth embodiment in which the air conditioning system of the present disclosure is adapted to an air conditioning system for vehicles will be described.

Figure 7:
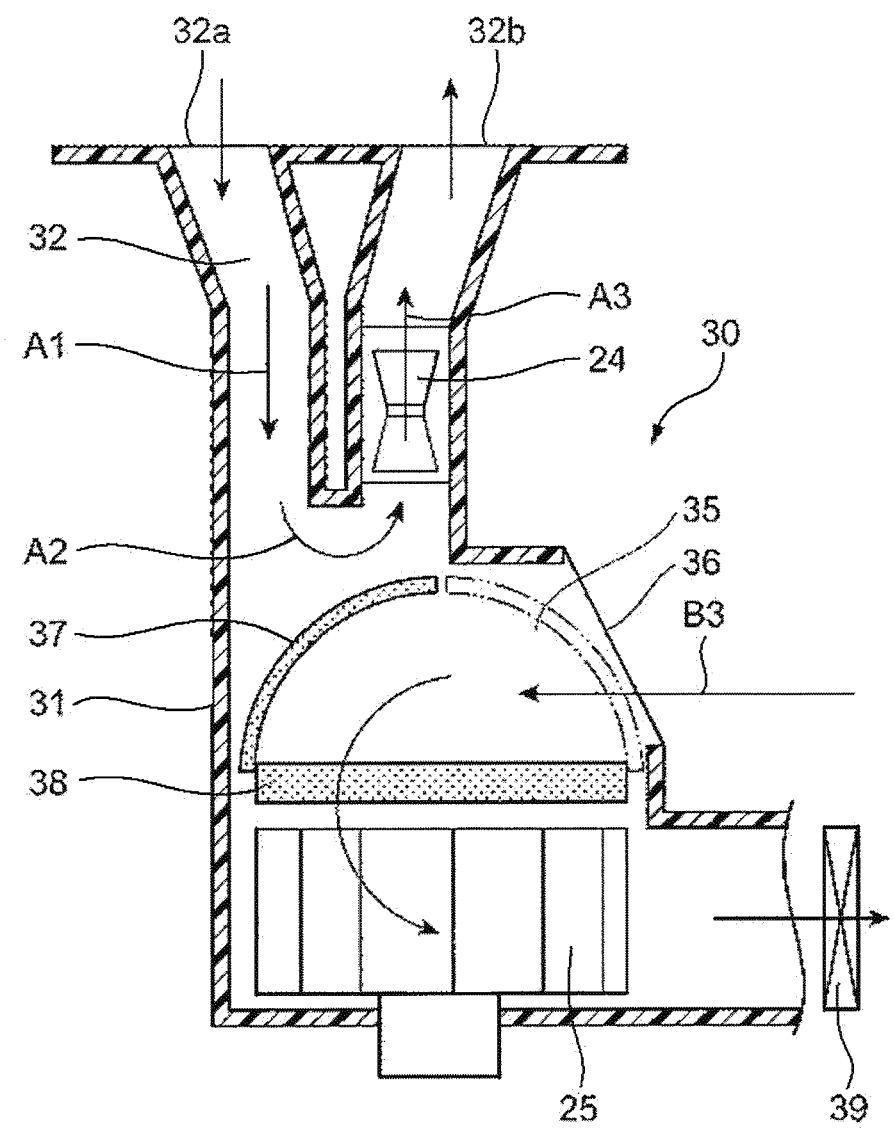
FIG. 7 is a cross-sectional view of an air conditioning device for a vehicle according to a sixth embodiment.

FIG. 7 is a cross-sectional view of an air conditioning device for vehicles according to the sixth embodiment. In the fifth embodiment described above, the permeable membrane is integrated into the permeable membrane module 33. In the sixth embodiment, on the other hand, the permeable membrane is integrated with the inside and outside air switching door 37, as shown in FIG. 7. In particular, an arc surface of the inside and outside air switching door (rotary door) 37 is constructed of the permeable membrane 13. With this configuration, the first inside air introduction port 34 is eliminated in the present embodiment.

In this configuration, in the inside air circulation mode, the outside air introduced from the outside air inlet portion 32a is supplied to one surface of the permeable membrane 13 (outer surface of the inside and outside air switching door 37), and the inside air introduced from the second inside air introduction port 36 is supplied to the other surface of the permeable membrane 13 (inner surface of the inside and outside air switching door 37).

In the present embodiment, since the permeable membrane is integrated with the inside and outside air switching door 37, the size and the costs of the air conditioning device 30 for vehicles can be reduced.

Seventh Embodiment

Figure 8A:
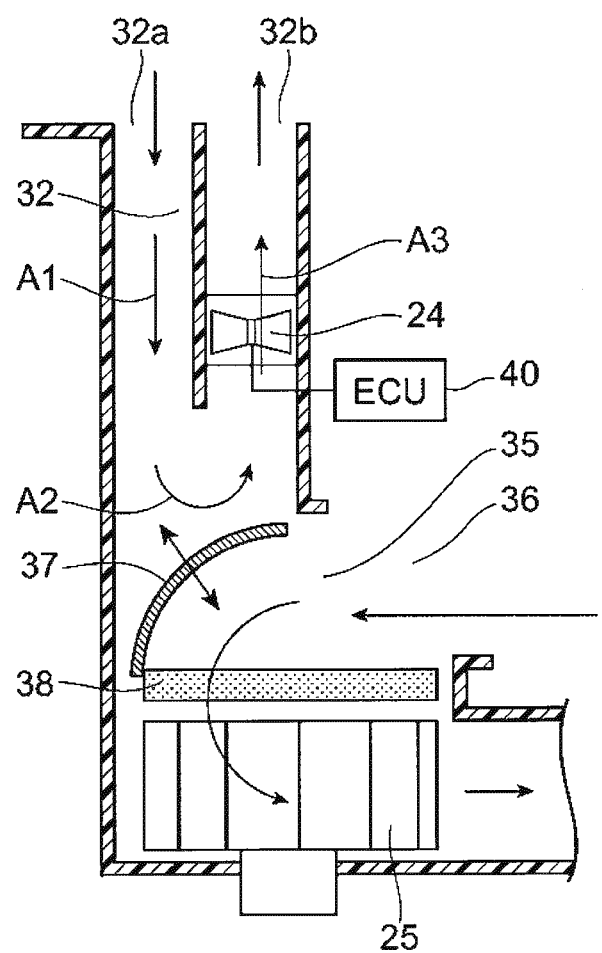
FIG. 8A is a cross-sectional view of an air conditioning device for a vehicle, in an inside air circulation mode, according to a seventh embodiment.
Figure 8B:
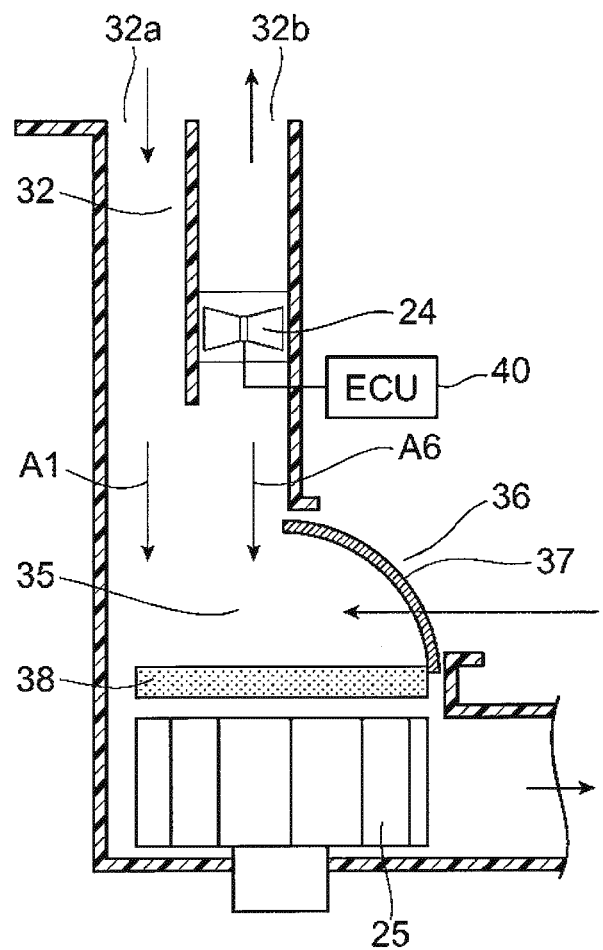
FIG. 8B is a cross-sectional view of the air conditioning device for a vehicle, in an outside air circulation mode, according to the seventh embodiment.

Next, a seventh embodiment in which the air conditioning system of the present disclosure is adapted to an air conditioning system for vehicles will be described. FIG. 8A is a cross-sectional view of an air conditioning device for vehicles, in an inside air circulation mode, according to the seventh embodiment. FIG. 8B is a cross-sectional view of the air conditioning device for vehicles, in an outside air circulation mode, according to the seventh embodiment.

In the seventh embodiment, the outside air blower 24 is stopped or the direction of rotation of the outside air blower 24 is reversed from that of the inside air circulation mode in the outside air introduction mode, in the structure of the sixth embodiment described above. That is, in the inside air circulation mode shown in FIG. 8A, the air conditioner control unit (ECU) 40 rotates the outside air blower 24 in a forward direction to discharge the outside air from the outside air outlet portion 32b as shown by the arrow A3. In the outside air introduction mode shown in FIG. 8B, the air conditioner control unit 40 stops the outside air blower 24 or rotates the outside air blower 24 in a reverse direction to introduce the outside air from the outside air outlet portion 32b as shown by an arrow A6.

Therefore, in the outside air introduction mode, the outside air can be introduced from both of the outside air inlet portion 32a and the outside air outlet portion 32b, the permeable membrane 13 can be disposed in the air conditioning device 30 for vehicles without increasing the size of the outside air introduction passage of the air conditioning device 30 for vehicles from a conventional size.

Eighth Embodiment

Next, an eighth embodiment in which the air conditioning system of the present disclosure is adapted to an air conditioning system for vehicles will be described.

In the eighth embodiment, to restrict odors in the outside air from entering the passenger compartment through the permeable membrane 13 in a case where a concentration of the odors of the outside air is high, a blower stopping device to stop at least one of the outside air blower 24 and the air conditioner blower 25 is provided in the structure of the third embodiment. The case where the concentration of the odors of the outside air is high intends, for example, a case where the vehicle travels in a tunnel, or the like.

The blower stopping device controls the on and off state of at least one of the outside air blower 24 and the air conditioner blower 25 according to the odor concentration of the outside air. In this example, the odor concentration of the outside air is detected by an odor concentration sensor (not shown) provided at a grill of the vehicle, the outside air passage 20 or the like, and the air conditioner control unit (not shown) controls the on and off state of at least one the outside air blower 24 and the air conditioner blower 25.

Figure 9:
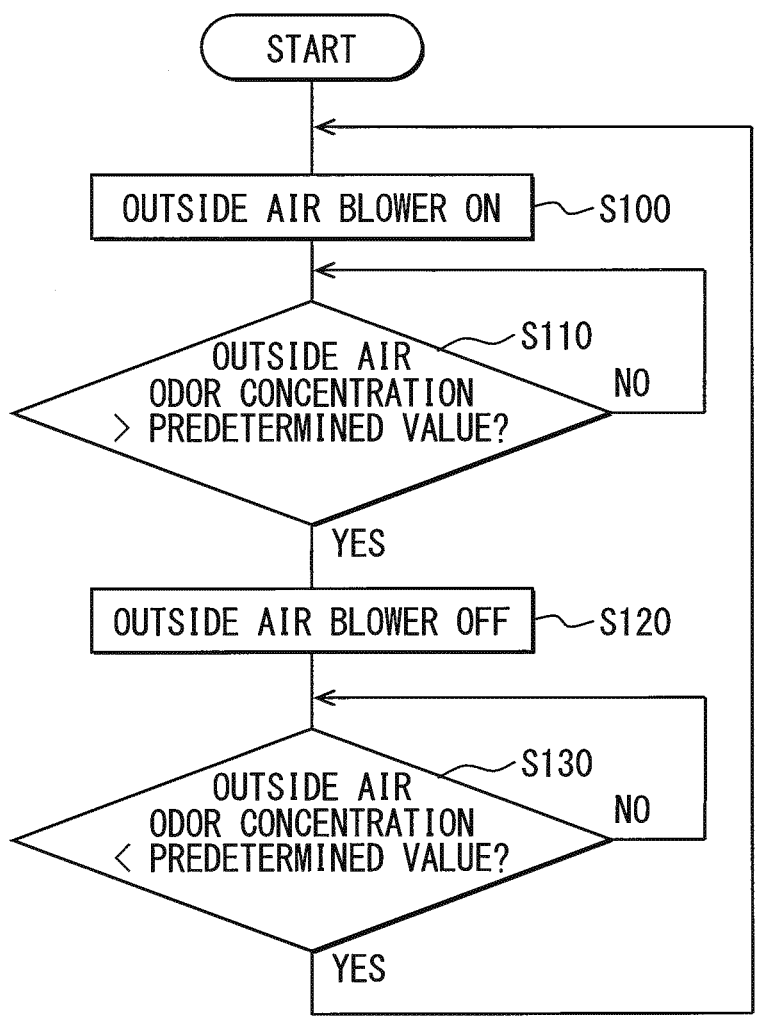
FIG. 9 is a flowchart of an air conditioning device for a vehicle according to an eighth embodiment.

FIG. 9 is a flowchart illustrating an outline of the on and off control of the outside air blower 24 performed by the air conditioner control unit. The air conditioner control unit firstly turns on the outside air blower 24 at step S100. Next, at step S110, the air conditioner control unit determines whether the odor concentration of the outside air detected by the odor concentration sensor is greater than a predetermined value.

When the air conditioner control unit determines that the odor concentration of the outside air is greater than the predetermined value at the step S110, the air conditioner control unit turns off the outside air blower 24 at step S120. Further, at step S130, the air conditioner control unit determines that the odor concentration of the outside air is lower than the predetermined value. When the air conditioner control unit determines that the odor concentration of the outside air is lower than the predetermined value, the control returns to the step S100.

When the air conditioner control unit determines that the odor concentration of the outside air is equal to or greater than the predetermined value at the step S130, the air conditioner control unit repeats the determination of the step S130. When the air conditioner control unit determines that the odor concentration of the outside air is equal to or lower than the predetermined value at the step S110, the air conditioner control unit repeats the determination of the step S110.

The on and off control of the air conditioner blower 25 is performed by the air conditioner control unit in the similar manner to FIG. 9. Therefore, the description of the on and off control of the air conditioner blower 25 will be omitted.

In the present embodiment, when the odor concentration of the outside air is high, the supply of at least one of the outside air and the inside air to the permeable membrane 13 can be restricted. Therefore, the entry of the odors to the passenger compartment 11 can be suppressed by restricting the amount of gas that permeates through the permeable membrane 13.

As such, the size and the costs of the air conditioning device for vehicles can be reduced, as compared with a case of having a device for closing the permeable membrane 13 to restrict the entry of the odors to the passenger compartment 11 when the odor concentration of the outside air is high.

The blower stopping device may be provided by a manual stopping device, such as a blower stopping switch manually operated by a passenger, for example.

Ninth Embodiment

Next, a ninth embodiment in which the air conditioning system of the present disclosure is adapted to an air conditioning system for vehicles will be described.

In the ninth embodiment, a door switching device that detects or estimates the amount of fogging of the window and switches the inside and outside air switching door 37 to a position of the outside air introduction mode is provided so as to restrict the fogging of the window in the fifth to seventh embodiments described above.

The door switching device switches the inside and outside air switching door 37 to the position of the outside air introduction mode when the amount of fogging of the window exceeds a predetermined value. In this example, the air conditioner control unit (not shown) described above switches the inside and outside air switching door 37. For example, the estimation of the fogging of the window can be performed by the air conditioner control unit. The air conditioner control unit calculates the amount of the window fogging based on inside air temperature and inside air humidity detected by an inside air temperature sensor and an inside air humidity sensor.

Figure 10:
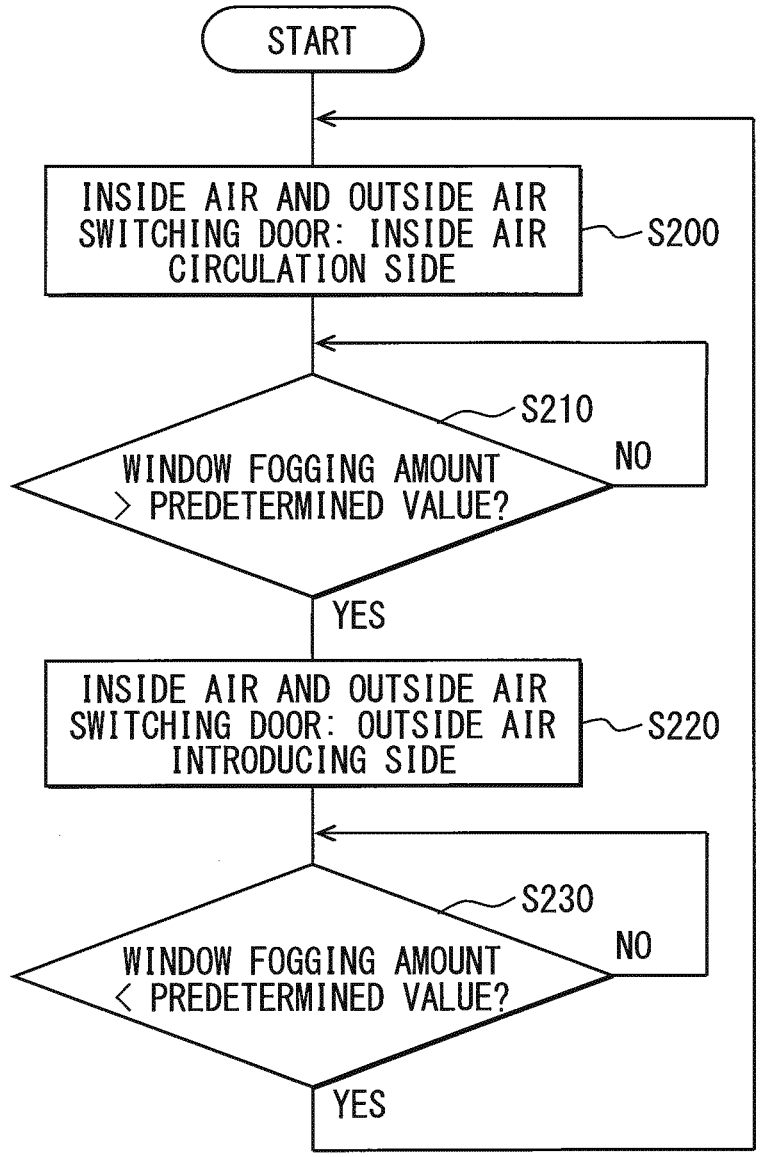
FIG. 10 is a flowchart of an air conditioning device for a vehicle according to a ninth embodiment.

FIG. 10 is a flowchart illustrating an outline of the switching control of the inside and outside air switching door 37 by the air conditioner control unit. First, the air conditioner control unit moves the inside and outside air switching door 37 to a position of the inside air circulation mode (inside air circulation side) at a step S200. Next, the air conditioner control unit determines whether the amount of fogging of the window is greater than a predetermined value at a step S210.

When the air conditioner control unit determines that the amount of fogging of the window is greater than the predetermined value at the step S210, the air conditioner control unit switches the inside and outside air switching door 37 to the position of the outside air introduction mode (outside air introduction side) at step S220. At step S230, the air conditioner control unit determines whether the amount of fogging of the window is lower than the predetermined value. When the air conditioner control unit determines that the amount of fogging of the window is lower than the predetermined value, the control returns to the step S200.

When the air conditioner control unit determines that the amount of fogging of the window is equal to or greater than the predetermined value, the air conditioner control unit repeats the determination of the step S230. When the air conditioner control unit determines that the amount of fogging of the window is equal to or lower than the predetermined value at the step S210, the air conditioner control unit repeats the determination of the step S210.

In the present embodiment, when a concentration of vapor inside of the passenger compartment 11 is high and the window is fogged, the outside air is introduced and the concentration of the vapor inside of the passenger compartment 11 can be reduced. Therefore, the fogging of the window can be restricted.

Tenth Embodiment

Figure 11:
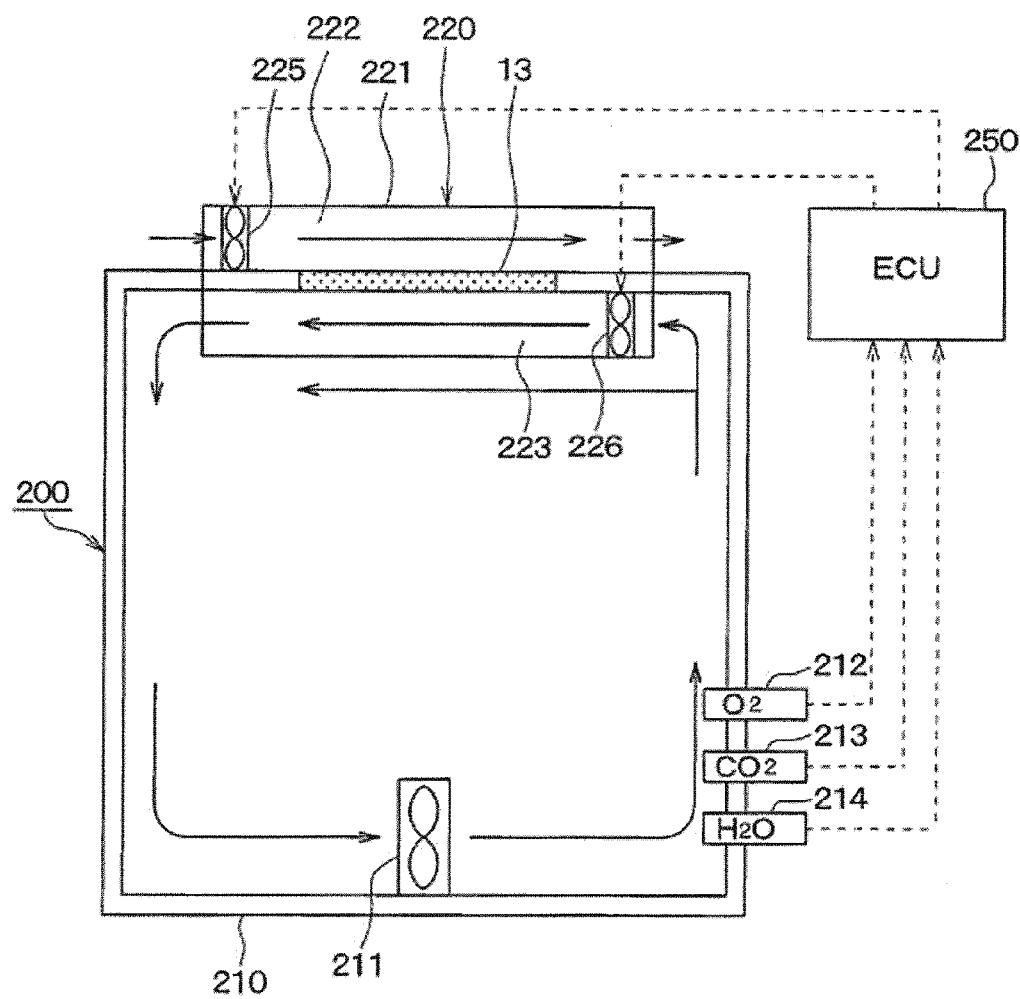
FIG. 11 is a schematic diagram of an air conditioning system for a container according to a tenth embodiment.

Next, a tenth embodiment in which the air conditioning system of the present disclosure is adapted to an air conditioning system for containers will be described. FIG. 11 is a schematic diagram of an air conditioning system 200 for containers according to the tenth embodiment.

As shown in FIG. 11, the air conditioning system 200 for containers has a casing 210 that can store an object to be stored therein. The casing 210 of the present embodiment is configured as a refrigerator, a freezer, or a freezing container, which stores fruit and vegetables. Although an illustration is omitted, the casing 210 is provided with an air conditioning device for adjusting the temperature of inside air to a desired temperature. The air conditioning device can employ a known refrigerating cycle for cooling a conditioning air, and employ a known heater (electric-type or combustion-type) for heating a conditioning air.

The casing 210 is provided with an inside air circulation blower 11 for circulating the inside air in the entirety of the inside of the casing 210. The casing 210 is further provided with an $O_2$ sensor 21 for detecting a concentration of oxygen in the inside air, a $CO_2$ sensor 213 for detecting a concentration of carbon dioxide in the inside air, a humidity sensor 214 for detecting a humidity of the inside air.

The casing 210 is provided with a permeable membrane unit 220. The permeable membrane unit 220 is provided with a passage forming member 221 that forms an outside air passage 222 and an inside air passage 223. The passage forming member 221 is located inside and outside of the casing 210 while extending over the wall of the casing 210 as a boundary. The permeable membrane 13 is disposed at the boundary between the outside air passage 222 and the inside air passage 223. That is, the part of the wall of the casing 210 is provided by the permeable membrane 13. In the outside air passage 222, the outside air existing outside of the casing 210 can flow along the surface of the permeable membrane 13. In the inside air passage 223, the inside air existing inside of the casing 210 can flow along the surface of the permeable membrane 13.

An outside air blower 225 is provided in the outside air passage 222 for causing the outside air to flow. An inside air blower 26 is provided in the inside air passage 223 for causing the inside air to flow. These blowers 225, 226 are the one that has a compression ratio of less than two, among fluid machines that give kinetic energy to gas or increases pressure, in particular, are a fan, a blower, and the like. These blowers 225, 226 include an air blowing fan and a motor that rotationally drives the fan.

In the example shown in FIG. 11, the outside air flows in the outside air passage 222 from the left to the right, and the inside air flows in the inside air passage 213 from the right to the left. Inside of the casing 210, a circulation flow of the inside air is generated by the inside air circulation blower 211. However, when the inside air blower 226 is not operated, the flow of the inside air is not generated in the inside air passage 223.

When the outside air blower 225 or the inside air blower 226 is not in operation, gas stagnates in the vicinity of the surface of the permeable membrane 13 and a difference of concentration between the outside air and the inside air is small. Therefore, permeation of the gas is not progressed. In this case, when at least one of the outside air blower 225 and the inside air blower 226 is operated, the stagnation of the gas in the vicinity of the surface of the permeable membrane 224 can be solved, and the permeation of the gas can be progressed.

The air conditioning system 200 for containers is provided with a control unit 250. The control unit 250 is constructed of a known microcomputer including a CPU, a ROM, a RAM and the like and peripheral circuits thereof. The control unit 250 performs various computations and processing based on control programs stored in the ROM, and controls operations of various devices connected at an output side. The control unit 250 receives sensor signals from the $O_2$ sensor 212, the $CO_2$ sensor 213, and the humidity sensor 214. The control unit 250 outputs controls signals to the outside air blower 225 and the inside air blower 226 based on these sensor signals to perform air blowing control.

The fruit and vegetables breathe also after being stored in the casing 210. Therefore, the concentration of oxygen inside of the casing 210 is lower than that of the atmosphere, and the concentration of carbon dioxide inside of the casing 210 is higher than that of the atmosphere. It is known that the breathing of the fruit and vegetables can be reduced in a state where the concentration of oxygen is low and the concentration of carbon dioxide is high, and the freshness can be kept for a long time. On the other hand, if the concentration of oxygen is excessively low, metabolism of the fruit and vegetables occurs, and there is a possibility of generating the different taste or off-flavor, or decomposing. The fruit and vegetables contain an amount of moisture. In the state where the fruit and vegetables are stored in the casing 210, a relative humidity of the casing 210 is likely to increase due to the moisture emitted from the fruit and vegetables. If the relative humidity in the casing 210 is too high, dew condensation will occur. If the relative humidity in the casing 210 is too low, the fruit and vegetables will wither. Both of the cases are not preferable to keep the freshness of the fruit and vegetables. From these reasons, it is necessary to regulate the concentrations of oxygen and carbon dioxide and the humidity of the casing 210 to desired ranges suitable for storing the fruit and vegetables. In the present embodiment, as the control unit 250 controls the air volumes of the outside air blower 25 and the inside air blower 26 based on the sensor signals of the $O_2$ sensor 212, the $CO_2$ sensor 213, and the humidity sensor 214, the concentrations of oxygen and carbon dioxide and the relative humidity are regulated.

In the present embodiment described above, since the permeable membrane 13 is used, only the gas ($O_2$, $CO_2$, $H_2O$) that has the concentration difference between the outside air and the inside air can be transferred. Therefore, because a gas (for example, $N_2$) without having the concentration difference between the outside air and the inside air is not transferred, the inside air whose temperature has been conditioned (cooled in this embodiment) is restricted from being excessively discharged to the outside air. As such, thermal load of the air conditioning system 200 for containers can be reduced.

Other Embodiments

In each of the embodiments described above, a specific arrangement position of the permeable membrane is exemplified. The arrangement position of the permeable membrane is not limited to these examples, and the permeable membrane can be arranged in a luggage room of vehicles, on a side wall of vehicles, or the like.

In the fifth embodiment described above, only the outside air passage 32 is provided as the outside air introduction passage for introducing the outside air to the air conditioner blower 25, and the permeable membrane module 33 is disposed in the outside air passage 32. Alternatively, it may be configured such that another passage in which the permeable membrane module 33 is not disposed may be provided in parallel to the outside air passage 32 as the outside air introduction passage.

The structures of the embodiments described above may be combined in any suitable way.

(Permeable Membrane Structural Body)

Figure 12:
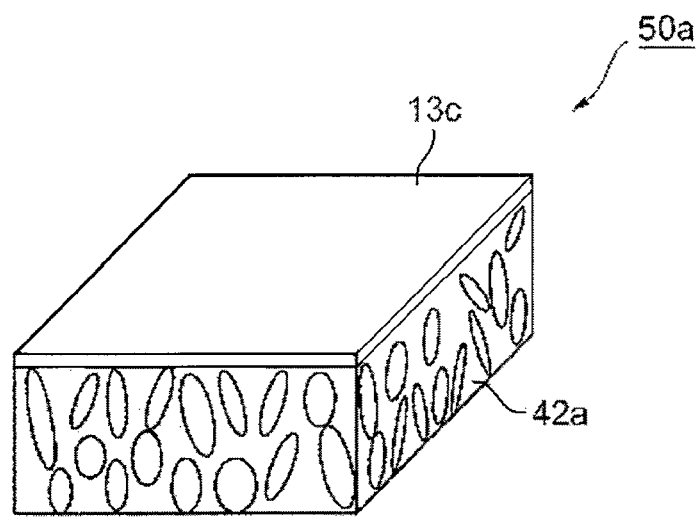
FIG. 12 is a perspective cross-sectional view of a modified example of a permeable member.
Figure 13:
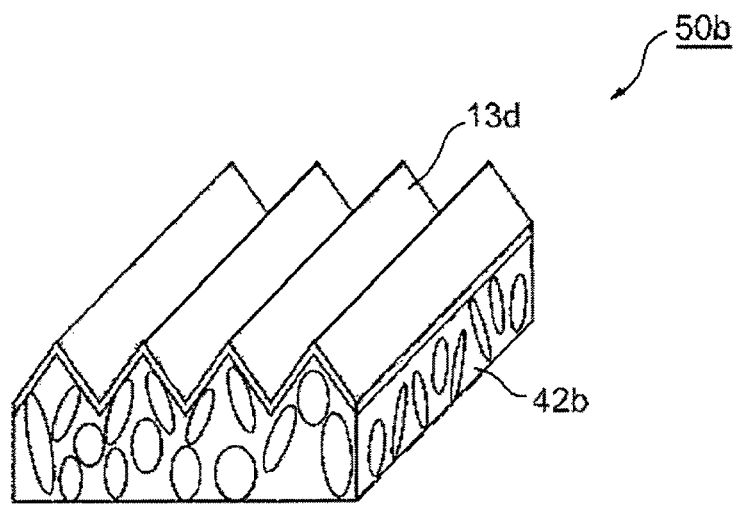
FIG. 13 is a perspective cross-sectional view of a modified example of a permeable member.

In the above-described air conditioning system for residential houses, air conditioning systems for vehicles, and air conditioning system for containers, a permeable membrane structural body 50a shown in FIG. 12 or a permeable membrane structural body 50b shown in FIG. 13 may be used, in place of the permeable membrane 13.

The permeable membrane structural body 50a includes a permeable membrane 13c and a support member 42a. The permeable membrane 13c has a plane shape, and is supported by the support member 42a that has a plane shape and tightly contacts with one surface of the permeable member 13c. The support member 42a may contact with only a part of the permeable member 13c, such as a peripheral portion of the permeable member 13c, or may fully contact with the permeable membrane 13c.

The permeable membrane 50b of FIG. 13 includes a permeable membrane 13d and a support member 42b. The permeable membrane 13d has a pleated shape, and is supported by the pleated support member 42b that contact with one surface of the permeable membrane 13d. The support member 42b may contacts with only a part of the permeable membrane 13d, or may fully contact with the permeable membrane 13d.

The permeable membranes 13c, 13d are provided by a membrane that is made of the polymeric material described above. The thickness of the permeable membranes 13c, 13d is preferably 0.1 to 10 μm. The support members 42a, 42b are one that can permeate gases. Examples of the support members 42a, 42b are a paper-shaped fiber member, a porous member having a pore diameter of 0.1 to 500 μm, and a mesh. The thickness of the support member is preferably 50 to 500 μm. The support members 42a, 42b are preferably a heat insulating member. In such cases, it is easy to improve heat efficiency of the air conditioning system 100 for residential houses.

According to these permeable membrane structural bodies 50a, 50b, since the permeable membranes 13c, 13d are supported by the support members, the amount of gases permeating through the permeable membrane can be increased by reducing the thickness of the permeable membrane 13c, 13d, and the strength of the permeable membrane structural body can be ensured. Further, in the permeable membrane structural body 50b, since the surface areas of the permeable membranes 13c, 13d increase, the amount of gases permeating through the permeable membranes 13c, 13d can be further increased.

For example, the permeable membrane structural bodies described above can be produced by forming the permeable membrane by the film formation processing method described above on a film that is removable in a post-process, transferring the support member on the permeable membrane formed, and removing the above-described film after the support member is transferred. Examples of the film that is removable in a post-process, are a film that can be removed by washing with water, a solvent, or chemicals, and a film that is removed after reforming by radiation of a UV, an EB or the like. Examples of the method of transferring the support member on the permeable member are a method of adhering the permeable membrane and the support member with a bonding agent or an adhesive interposed between the permeable membrane and the support member, and a method of adhering the permeable membrane and the support member by dissolution with heat or a solvent.

EXAMPLES

Hereinafter, the present disclosure will be described more in detail with reference to examples. However, the present disclosure is not limited to the examples described hereinafter.

Example 1

In the example 1, synthesis of a cyclic olefin addition polymer (Polymer a) will be described as an example of production of a polymer.

In a glass container purged with nitrogen, 53.6 g (0.2 mol) of Monomer a, and 37 mg (40 μmol) of trityltetra(pentafluorophenyl)borate $\{[Ph_3C] [B(C_6F_5)_4]\}$ were dissolved in 150 ml of toluene. A catalyst solution separately prepared (a solution in which 9 mg (40 μmol) of cyclopentadienyl(allyl)palladium $[C_5H_5PdC_3H_5]$ and 12 mg (40 μmol) of tricyclohexylphosphine $[PCy_3]$ were dissolved in 15 ml of toluene) was added to the solution, and a polymerization reaction was carried out for 5 hours at a room temperature (25° C.).

After the reaction finishes, the polymerization solution was put into a large amount of methanol to extract the polymer, filtered, washed, and dried under a reduced pressure for 12 hours at 120° C. As a result, 51.5 g (yield 91%) of Polymer a was obtained.

The molecular weight of the obtained Polymer a measured by the GPC measurement was Mn=558,000, and the molecular weight distribution of the obtained Polymer a was Mw Mn=3.22.

[Chemical 11]

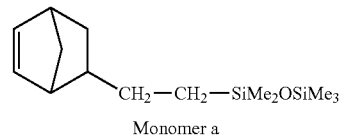

(6)

Monomer a

Example 2

In the example 2, synthesis of a cyclic olefin addition polymer (Polymer b) will be described as an example of production of a polymer.

In a glass container purged with nitrogen, 37.5 g (0.14 mol) of Monomer a, 5.6 g (0.06 mol) of Monomer b, and 37 mg (40 μmol) of trityltetra(pentafluorophenyl)borate $\{[Ph_3C] [B(C_6F_5)_4]\}$ were dissolved in 140 ml of toluene. A catalyst solution separately prepared (a solution in which 9 mg (40 μmol) of cyclopentadienyl(allyl)palladium $[C_5H_5PdC_3H_5]$), and 12 mg (40 μmol) of tricyclohexylphosphine $[PCy_3]$ were dissolved in 15 ml of toluene) was added to the solution, and a polymerization reaction was carried out for 5 hours at a room temperature (25° C.).

After the reaction finishes, the polymerization solution was put into a large amount of methanol to extract the polymer, filtered, washed, and dried under a reduced pressure for 12 hours at 120° C. As a result, 39.2 g (yield 91%) of Polymer b was obtained.

The molecular weight of the obtained Polymer b measured by the GPC measurement was Mn=599,000, and the molecular weight distribution of the obtained Polymer b was Mw/Mn=3.24. It was confirmed, by 1H-NMR spectrum, that the composition ratio of the structural body derived from the Monomer a and that derived from the Monomer b in the polymer was a/b=70/30 (mol/mol).

[Chemical 12]

(7)

Monomer b

[Production of Mesh Body with Improved Surface Adhesion]

An adhesion improver X-92-470 (made by Shin-Etsu Chemical Co., Ltd., 10% of a solid content, a toluene-ethyl acetate solvent) was uniformly applied to a surface of a mesh body (material:PET, opening ratio:46%, opening diameter:85 µm), and was air-dried at a room temperature. Further, heat treatment for 5 minutes at 120° C. was performed to obtain a mesh body whose surface adhesion was improved.

Comparative Example 1

An asymmetric membrane disclosed as an example 14 (see paragraph 0219 and FIG. 15) of Japanese Patent Application Publication No. 2011-12114 is referred to as a comparative example to the above-described example 1 and example 2.

[Evaluation of Membrane]

(1) Check for Presence of Pores

Figure 14A:
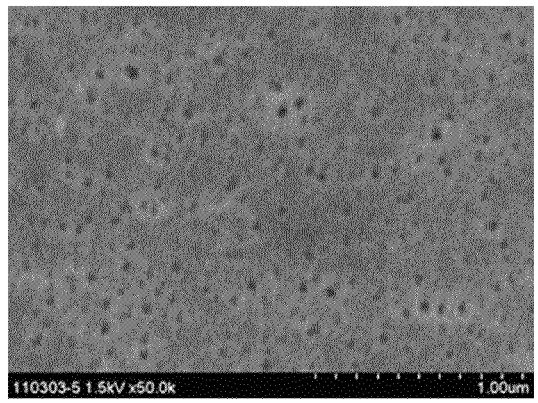
FIG. 14A is a diagram showing a SEM image of an asymmetric membrane of an example 1.
Figure 15A:
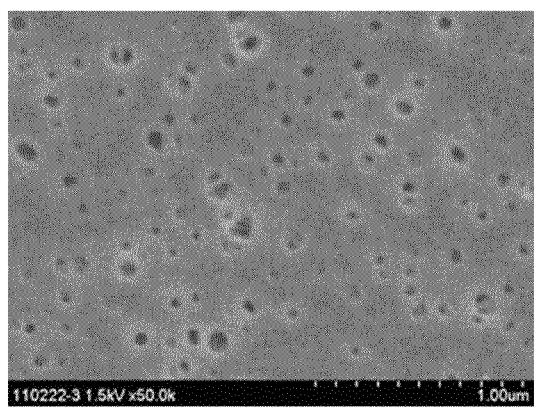
FIG. 15A is a diagram showing a SEM image of an asymmetric membrane of an example 2.
Figure 16A:
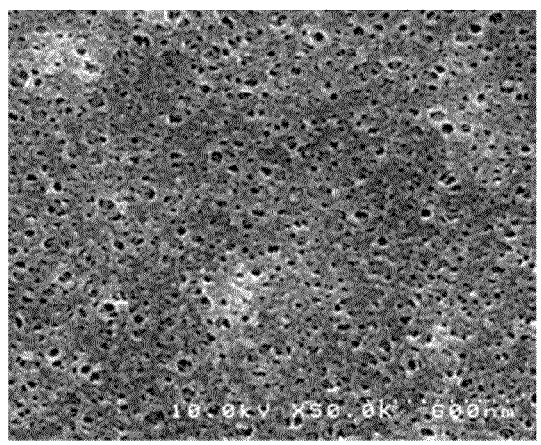
FIG. 16A is a diagram showing a SEM image of an asymmetric membrane of a comparative example.
Figure 14B:
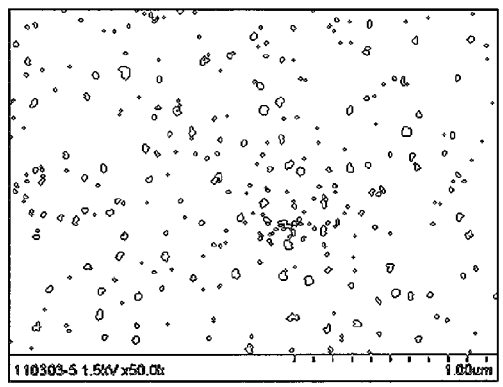
FIG. 14B is a line diagram of the SEM image of the asymmetric membrane shown in FIG. 14A.
Figure 15B:
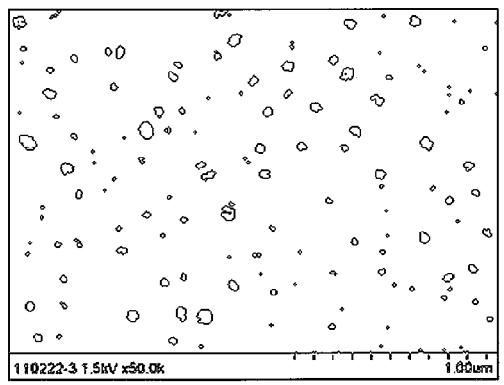
FIG. 15B is a line diagram of the SEM image of the asymmetric membrane shown in FIG. 15A.
Figure 16B:
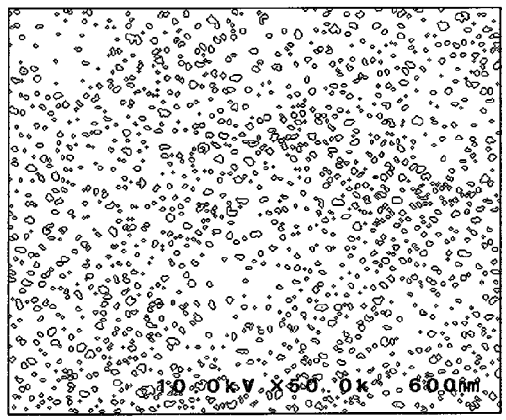
FIG. 16B is a line diagram of the SEM image of the asymmetric membrane shown in FIG. 16A.

In regard to the asymmetric membranes obtained in the examples and the comparative example, the surface thereof (on a dense layer side in the asymmetric membrane) was observed by a scanning electron microscope (SEM), and presence of pores was checked. The results are shown in Table 1. FIG. 14A is a diagram illustrating a SEM image of the asymmetric membrane of the example 1. FIG. 14B is a line diagram of the SEM image of FIG. 14A. FIG. 15A is a diagram illustrating a SEM image of the asymmetric membrane of the example 2. FIG. 15B is a line diagram of the SEM image of FIG. 15A. FIG. 16A is a diagram illustrating a SEM image of the asymmetric membrane of the comparative example. FIG. 16B is a line diagram of the SEM image of FIG. 16A.

(2) Gas Permeability Coefficient (Uniform Pressure Method)

Figure 17:
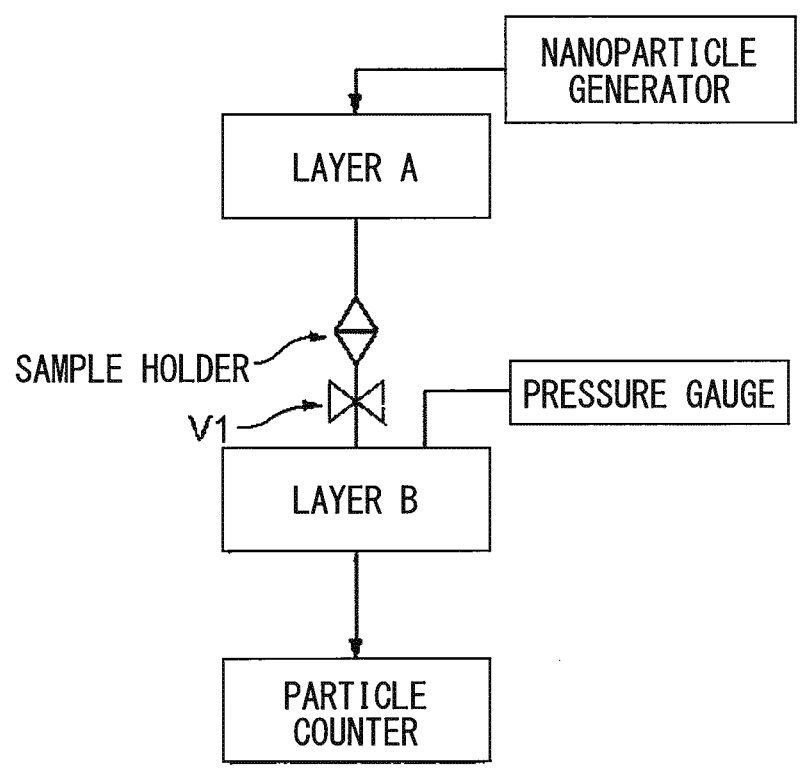
FIG. 17 is a schematic diagram of a gas permeability evaluation apparatus for measuring a gas permeability coefficient.

Using an apparatus for measuring a gas permeability at uniform pressure (made by DENSO CORPORATION, see a gas permeability evaluation apparatus in FIG. 17), the gas permeability coefficients of oxygen and carbon dioxide ($P(O_2)$ and $P(CO_2)$) of the asymmetric membrane obtained in the examples 1, 2 and the water surface spread membrane obtained in the comparative example were measured under the following measurement conditions. The obtained gas permeability coefficients ($P(O_2)$ and $P(CO_2)$) were divided by the thickness (L) of the membrane to calculate gas permeation rates ($P(O_2)/L$ and $P(CO_2)/L$). Also, the separation ratio $\alpha$ ($=P(O_2)/P(CO_2)$) was also calculated. The results are shown in Table 1.

In regard to an initial environment in the evaluation apparatus, the initial concentration environment was created by supplying the gas to an evaluation chamber from a cylinder in which the concentrations of oxygen and carbon dioxide were adjusted in advance (for example, oxygen concentration: 20.5%, carbon dioxide concentration: 4000 ppm). Outside the evaluation chamber is atmospheric air (oxygen concentration: 20.8 to 20.9%, carbon dioxide concentration: 400 to 600 ppm). A partition plate (not shown) is provided in a membrane installation part so as to block the membrane from outside air by the partition plate before the evaluation begins. The evaluation of the membrane was begun by removing the partition plate in the membrane installation part under the measurement conditions below, and gas exchange between the outside and the inside of the evaluation chamber was performed. Namely, the gas permeation rates with respect to the oxygen and the carbon dioxide were measured based on changes in the gas concentrations of the two components in the evaluation chamber. In the initial concentration environment, the flow direction of the gases to be measured with respect to the membrane was such that oxygen flows from the outside to the inside, and carbon dioxide flows from the inside to the outside. The concentration of oxygen and the concentration of carbon dioxide inside and outside of the evaluation chamber were measured by an oxygen sensor (made by Chino Corporation, model: MG1200) and a carbon dioxide sensor (made by Vaisala Corporate, model: GMP343), and recorded on a data logger (made by Chino Corporation, model: KIDS verb).

(Measurement Conditions)

Temperature: 23±2 degrees

Pressure difference across the membrane: zero

Partial pressure differences in the gases across the membrane: oxygen 0.0013-0.0066 atm, carbon dioxide 0.0001-0.0011 atm.

(3) SPM-Blocking Ratio

Figure 18:
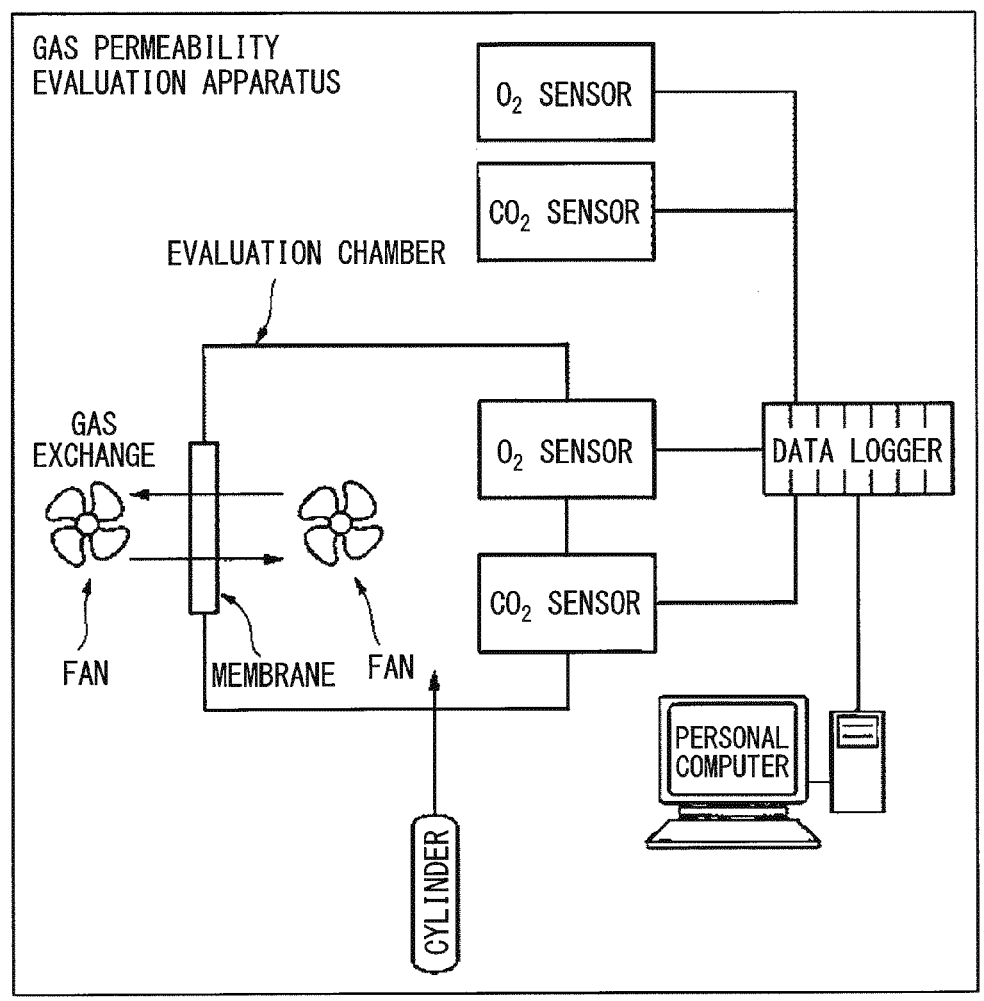
FIG. 18 is a schematic diagram of a measuring device for measuring an SPM-blocking ratio.

The SPM-blocking ratio was measured in the procedure below using a measurement apparatus (see FIG. 18) in which a layer A connected with a nanoparticle generator (made by Palas, model: GFG-1000) and a layer B connected with a particle counter (made by TSI Incorporated, model: SMPS-3034) were coupled via a holder in which a membrane sample was placed. The results are shown in Table 1.

(i) Carbon particles with particle sizes of 10 to 500 nm were generated by the nanoparticle generator and stored in the layer A.

(ii) A sample of an asymmetric membrane (a water surface spread membrane) was placed on the sample holder (membrane area: 16 $cm^2$ at maximum), and a valve V1 between the sample holder and the layer B was closed to reduce the pressure in the layer B until the differential pressure between the layer A and the layer B reaches 1 kPa.

(iii) The valve V1 was opened, and the carbon particles were carried by gases that permeate when the pressure in the layer B returns to atmospheric pressure to be supplied to the membrane, and the carbon particles that permeated through the membrane were stored in the layer B.

(iv) The concentration of the carbon particles in the layer B was measured using the particle counter.

(v) The SPM-blocking ratio was calculated based on the following expression.

SPM-blocking ratio [mass %]=100×{(Cin−Cout)/Cin}

(Cin: the particle concentration [μg/mL] in the layer A, Cout: the particle concentration [μg/mL] in the layer B)

(4) Strength of Membrane

Figure 19:
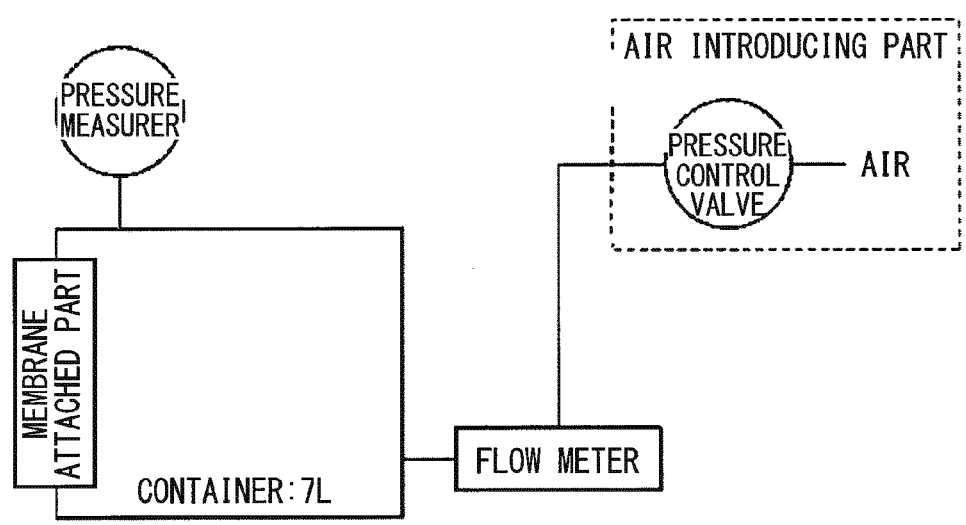
FIG. 19 is a schematic diagram of a device for measuring a strength of a membrane.

Strength of the membrane was measured using an apparatus shown in FIG. 19. This apparatus includes a 7 L aluminum container (made by DENSO CORPORATION) having a membrane installation part on which a membrane is mounted, an air introducing part that introduces air into the container, a pressure measuring part (pressure measure) that measures pressure in the container, and an introduced air measuring part (flow meter) that measures the amount of the air introduced into the container.

The air introducing part may be any one that can supply boosted air, such as a compressor and air inside a hall. The pressure measuring part is a part that performs evaluation by introducing air into the container in which a pressure gauge (made by Nidec Copal Electronics Corp., model: PG-30-101R or PG-30-102R) is installed (for example, from 1 to 50 kPa). The air measurement part measured the flow rate of gas (for example, from 1 to 200 sccm) at an arbitrary pressure (in the range of 1 to 50 kPa) with a mass flow meter (made by Kojima Instruments, Inc., model 3100). In regard to the pressure gauge and the mass flow meter, it is preferable to change combination of the pressure gauge and the mass flow meter according to resistance of the membrane, strength of the membrane, and the like (in particular, in a case where evaluation at a pressure of not more than 1 kPa is necessary).

An evaluation method is described below. In the example, although a procedure for measuring a container internal pressure at a fixed flow rate is described, a converse method may be employed.

First, after a membrane was installed to the membrane installation part of the container, the air was introduced into the contained and the flow rate thereof was kept at an arbitrary rate (1 to 200 sccm). When the container internal pressure was stabilized, the amount of the flow discharged from the membrane under the pressure was considered to be the air flow rate in the introduced air measuring part, and was used as the air flow rate at the pressure. The measurement was performed by gradually increasing the air flow rate from the lowest air flow rate (for example, increasing every 1% of the full scale). A phenomenon that the container internal pressure reduces is observed at some air flow rate. As an index of strength of the membrane, pressure data immediately before reduction in pressure was observed was used. The data is shown in Table 1. According to Table 1, it is appreciated that the strength of the membrane is largely improved in the examples 1, 2 of the present disclosure, as compared with the comparative example.

TABLE 1

| | Polymer | Adhesion Improvement | No. | Separation Ratio $P(O_2)/P(CO_2)$ | nSPM Blocking Ratio Wt % | Strength Evaluation kPa |
|---|---|---|---|---|---|---|
| Ex 1 | a | Yes | 1 | 1.18 | >99.9 | 100 |
| | | | 2 | 1.22 | >99.9 | 110 |
| Ex 2 | b | Yes | 1 | 1.20 | >99.9 | 100 |
| | | | 2 | 1.27 | >99.9 | 120 |
| Comp Ex | | Yes | | 1.35 | 99.81 | 43.2 |

The invention claimed is:

1. An air conditioning system comprising a permeable membrane, the air conditioning system performing at least one of gas supply to a space to be air conditioned through the permeable membrane and gas discharge from the space to be air conditioned through the permeable membrane, wherein the permeable membrane is an asymmetric membrane that is made of a cyclic olefin addition polymer obtained by addition polymerization of a cyclic olefin functionality siloxane expressed by a formula (1) given below, or by addition polymerization of the cyclic olefin functionality siloxane expressed by the formula (1) given below and a cyclic olefin compound expressed by a formula (2) given below, wherein a rate of a structural unit derived from the cyclic olefin functionality siloxane expressed by the formula (1) given below is 5 to 100 mol % of the addition polymer, and a number average molecular weight (Mn) is 10,000 to 2,000,000 in terms of polystyrene conversion measured by a GPC using tetrahydrofuran as a solvent, wherein, in the formula (1), $R^1$ is a monovalent organic group without having an aliphatic unsaturated bond, and is identical or different from each other, s is an integer of 0 to 2, i is 0 or 1, and j is an integer of 1 to 4, wherein in the formula (2), $A^1$ to $A^4$ are each independently a hydrogen atom, a halogen atom, a substituent group selected from an alkyl group, an alkenyl group, a cycloalkyl group, an aryl group, an alkoxy group, an aryloxy group and a halogenated hydrocarbon group, each having a carbon number of 1 to 10, or a polar substituent group selected from an oxetanyl group and an alkoxycarbonyl group, and wherein $A^1$ and $A^2$, or $A^1$ and $A^3$ may form, together with a carbon atom to which they are attached, an alicyclic structure, an aromatic ring structure, a carbon imide group, or an acid anhydride group, and k is 0 or 1.

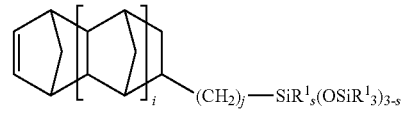

(1)

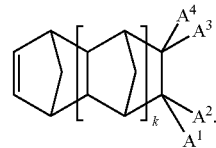

(2)

2. The air conditioning system according to claim 1, wherein the polymeric material is a polymeric material in which a silica filler is dispersed.

3. The air conditioning system according to claim 1, wherein a ratio between an oxygen permeability coefficient $P(O_2)$ and a carbon dioxide permeability coefficient $P(CO_2)$ of the asymmetric membrane at 23±2° C. and under no pressure difference across the membrane satisfies a formula (3) given below.

$$1.0 < P(O_2)/P(CO_2) < 1.70 \qquad (3)$$

4. The air conditioning system according to claim 1, wherein the air conditioning system is an air conditioning system for a vehicle.

5. The air conditioning system according to claim 1, wherein the air conditioning system is an air conditioning system for a residential house.

6. The air conditioning system according to claim 1, wherein the air conditioning system is an air conditioning system for a container.

\* \* \* \* \*